US012685619B2

(12) United States Patent
Fromovich

(10) Patent No.: US 12,685,619 B2
(45) Date of Patent: Jul. 21, 2026

(54) DENTAL IMPLANT THREAD

(71) Applicant: STRAUMANN HOLDING AG, Basel (CH)

(72) Inventor: Ophir Fromovich, Moshav Adanim (IL)

(73) Assignee: STRAUMANN HOLDING AG, Basel (CH)

(*) Notice: Subject to any disclaimer, the term of this patent is extended or adjusted under 35 U.S.C. 154(b) by 988 days.

(21) Appl. No.: 17/283,581

(22) PCT Filed: Oct. 10, 2019

(86) PCT No.: PCT/EP2019/077491

§ 371 (c)(1),
(2) Date: Apr. 8, 2021

(87) PCT Pub. No.: WO2020/074647

PCT Pub. Date: Apr. 16, 2020

(65) Prior Publication Data

US 2021/0338385 A1 Nov. 4, 2021

(30) Foreign Application Priority Data

Oct. 11, 2018 (EP) ..................................... 18199962

(51) Int. Cl.
*A61C 8/00* (2006.01)

(52) U.S. Cl.
CPC .......... *A61C 8/0022* (2013.01); *A61C 8/0025* (2013.01); *A61C 2008/0046* (2013.01)

(58) Field of Classification Search
CPC ....... A61C 8/00; A61C 8/0018; A61C 8/0022; A61C 8/0024; A61C 8/0025; A61C 8/0037

(Continued)

(56) References Cited

U.S. PATENT DOCUMENTS 5,984,681 A * 11/1999 Huang ................. A61C 8/0009
433/173
6,273,721 B1 * 8/2001 Valen ................... A61C 8/0066
433/174

(Continued)

FOREIGN PATENT DOCUMENTS

DE 102 38 091 A1 2/2004
EP 2 145 600 A1 1/2010
WO WO-2015118543 A1 * 8/2015 ............... A61C 8/00

OTHER PUBLICATIONS

Jan. 21, 2020 Search Report issued in International Patent Application No. PCT/EP2019/077491.

(Continued)

*Primary Examiner* — Edward Moran
(74) *Attorney, Agent, or Firm* — Oliff PLC

(57) ABSTRACT

A dental implant includes a threaded portion extending along a central longitudinal axis from an apical end to a coronal end. The threaded portion includes a core from which threading extends radially outwards, the threading including an apical flank, a coronal flank and a lateral surface connecting the apical and coronal flanks, the lateral surface defining the radially outermost surface of the threading. The threading extends along the length of the threaded portion in a helical manner and the thread width narrowing in the radially outwards direction such that the threading is widest where it contacts the core and narrows towards the lateral surface. The core diameter of the threaded portion is defined by the outer diameter of the core and the outer diameter of the threaded portion is defined by the lateral surface of the threading.

28 Claims, 4 Drawing Sheets

(58) Field of Classification Search
    USPC ....................................... 433/172–176, 201.1
    See application file for complete search history.

(56)                    References Cited

U.S. PATENT DOCUMENTS

| | | | |
|---|---|---|---|
| 9,681,930 B2 | 6/2017 | Thome et al. | |
| 2002/0090593 A1* | 7/2002 | Palti ..................... | A61C 8/0022 |
| | | | 433/174 |
| 2010/0009316 A1* | 1/2010 | Hurson ................ | A61C 8/0018 |
| | | | 433/173 |
| 2011/0123953 A1* | 5/2011 | Jorneus ................ | A61C 8/0022 |
| | | | 433/174 |
| 2016/0206406 A1 | 7/2016 | Andler | |
| 2018/0092720 A1 | 4/2018 | Aravena et al. | |

OTHER PUBLICATIONS

Apr. 8, 2021 International Preliminary Report on Patentability issued in International Patent Application No. PCT/EP2019/077491.

* cited by examiner

DENTAL IMPLANT THREAD

This is a national phase of PCT/EP2019/077491, filed Oct. 10, 2019, which claims the benefit of priority to EP 18199962.4, filed Oct. 11, 2018. The disclosure of the prior application is hereby incorporated by reference herein in its entirety.

The present invention relates to the external thread design of a dental implant for use in the jaw bone of a human patient.

Dental implants are used to replace individual teeth or for anchoring more complex structures, which generally replace several or even all of the teeth. The materials used for dental implants are often titanium and alloys thereof. These materials have the necessary strength for withstanding the mechanical loads that occur, and they are at the same time sufficiently biocompatible for osseointegration and long term use in the mouth. In recent years ceramic materials, such as zirconia and aluminium oxide, have also been gaining popularity as an implant material.

Implants have two essential parts: an anchoring part and an abutment part. The anchoring part is embedded in the bone, where it osseointegrates with the bone tissue to provide a firm anchor for the prosthesis. The abutment extends into the oral cavity and provides a support for the prosthesis. The desired prosthetic element (e.g. bridge or crown) is fastened over the abutment such that at least part of the abutment is housed within the prosthesis and provides core support to this. The prosthetic element can be adhesively bonded, cemented, screwed or directly veneered onto the abutment. In this latter case the prosthetic element and abutment effectively form a single component and future advances may enable the abutment and prosthetic element to be integrally formed, e.g., through 3D printing or the like.

The implant can be constructed in one part, such that the anchoring part and abutment part are produced in one integral, monolithic piece. Hence in such implant systems the integrated anchoring part and abutment are always positioned within the mouth at the same time and the single piece implant extends through the soft tissue into the oral cavity to form a core support for the prosthesis.

However, implants are also often constructed in two or more parts, in which case they consist of at least an anchoring component, often referred to in isolation as the implant, and a separate abutment, sometimes referred to as a spacer. The anchoring component is usually either embedded completely in the bone, that is to say to the height of the alveolar crest, or protrudes by a few millimetres from the alveolar crest into the soft tissue. Anchoring components intended for complete insertion into the bone are commonly referred to as "bone level" implants, while those which are intended to protrude into the soft tissue are commonly referred to as "tissue level" implants. The abutment is mounted either directly or indirectly to the anchoring component via one of a variety of known means. Most usually the abutment is either adhesively bonded or threadedly connected to the anchoring component.

In contrast to one piece implants, multi-part implants are more versatile, because the anchoring part and the abutment can be adapted to individual requirements. In particular the abutment shape and angulation, relative to the anchoring part, can be selected after insertion of the anchoring part. This provides the surgeon with more flexibility and room for error. An additional advantage of multi-part implants is that the abutment can be made from a different material than the anchoring part.

The present invention can be applied to both one part and multi-part implants. For the remainder of this specification therefore, the term "implant" will be used to denote the anchoring component of an implant system, namely, the element which in use is directly anchored within the bone. The implant may be a one-piece, bone level or tissue level implant.

As mentioned above, dental implants are made from material which osseointegrates with the bone. In other words, bone cells attach themselves to the implant surface such that the implant becomes integrated with the jaw bone. The osseointegration process typically takes 3-6 months to occur. During this time the implant must be firmly held within the bone through mechanical means. This mechanical fixation of the implant within the bone is referred to as "primary stability". The majority of contemporary implants comprise threads on the exterior surface of the implant which are used to screw and secure the implant within a, usually surgically prepared, bore hole. These threads provide primary stability during osseointegration and, in comparison to smooth walled implants, provide a greater surface area for osteoblasts (bone cells) to attach to.

The shape of the external threads of the implant can have a large impact not just on primary stability, but also on the speed of osseointegration. During creation of the bore hole, the bone is necessarily damaged. This occurs due to the removal of bone, as well as the heat and friction generated during the use of drilling instruments. It is commonly observed that, after implant placement, the bone cells "die back" for a period before new bone cells begin the process of osseointegration. Implant manufacturers therefore strive to produce implant designs which will provide the highest primary stability with minimal damage to the bone, thus limiting die back and encouraging early onset of osseointegration.

To this end, "self tapping" implants have been developed. The aim of such implants is to enable the implant to be inserted into the bone without the need to tap the bore hole first. Such pre-tapping requires the use of an additional instrument and hence causes additional trauma to the bone. In addition, the step of tapping the bore hole adds time and complexity to the surgical procedure as well as removing additional bone material.

The ability of an implant to self tap, namely, to cut into the bone, is heavily dependent on the bone quality of the individual patient. Human patients exhibit a range of bone densities. The softer the bone the easier and indeed advantageous it is for implants to be inserted into a non-tapped or even underprepared bone hole, that is, a bore hole having a diameter less than the core diameter of the implant. Primary stability is naturally harder to achieve in softer bone and under preparation of the bore will result in compression of the bone around the implant, which improves the primary stability. Implant designs are known which compress soft bone around the threads as well as the core of the implant. In particular, apically tapered implants are considered to provide increased primary stability in soft bone over traditional "parallel-walled" (cylindrical) implants. WO 2015/118543 and US 2010/009316 disclose various implant designs intended to improve the primary stability of an implant.

However, in dense bone, in contrast to soft bone, compression of the bone can be damaging to the bone cells and the blood vessels within the bone. Furthermore, it may not be possible for even "self tapping" threads to cut through dense bone without incurring unacceptably high levels of torque, which could damage the implant. In dense bone therefore it is often still necessary for the bore hole to be tapped prior to insertion of implants marketed as self tapping, resulting in the above stated disadvantages of increased length and complexity of the implantation procedure as well as increased trauma to the bone.

Within the dental implantology field therefore, there continues to be a need to improve the ability of an implant to provide strong primary stability in both soft and hard bone, while at the same time resulting in minimum damage to the bone. Improving these aspects will decrease surgery time and reduce implant failures.

The aim of the present invention therefore is to provide a dental implant design which improves primary stability and self-tapping ability, particularly in hard bone.

According to a first aspect, the present invention provides a dental implant comprising a threaded portion extending along a central longitudinal axis from an apical end to a coronal end, the threaded portion comprising a core from which threading extends radially outwards, the threading comprising an apical flank, a coronal flank and a lateral surface connecting the apical and coronal flanks, the lateral surface defining the radially outermost surface of the threading, the threading extending along the length of the threaded portion in a helical manner and the thread width narrowing in the radially outwards direction such that the threading is widest where it contacts the core and narrows towards the lateral surface, the core diameter of the threaded portion being defined by the outer diameter of the core and the outer diameter of the threaded portion being defined by the lateral surface of the threading, wherein, over at least a section of the axial extent of the threaded portion, the thread profile of the threading is formed of exactly three sub-segments arranged sequentially in the radial direction, wherein in each sub-segment the apical and coronal flank taper towards one another at a constant angle, the middle sub-segment having a taper angle that is greater than the taper angles of the radially innermost and radially outermost sub-segments, the taper angle formed between the apical and coronal flanks in the radially outermost sub-segment being less than 30°.

In accordance with conventional dental terminology, "apical" refers to the direction towards the bone and "coronal" to the direction towards the teeth. Therefore, the apical end of a component is the end which, in use, is directed towards the jaw bone and the coronal end is that which is directed towards the oral cavity.

According to the present invention the outer diameter of the threaded portion is defined by the lateral surface of the threading. In other words, the outer diameter of the threaded portion is determined by the virtual surface containing the lateral surface of the threading. This can be best visualised when viewing a longitudinal cross-section or side view of the implant. By drawing two axially extending lines on either side of the implant, each line contacting and extending along the lateral surface of the threading, the diameter at any given axial location of the threaded portion is given by the distance between these lines.

In accordance with conventional dental terminology, thread "depth" refers to the length of the thread, measured in the radial direction, from the core to the lateral surface. Therefore the depth of the thread, at any given axial location, is the difference in radial length between the core and outer diameters. The "width" of the thread refers to the axial length of the thread measured in a longitudinal plane of the implant, i.e. a plane containing the central longitudinal axis of the threaded portion.

The "thread profile" of the threading refers to the shape formed by the apical and coronal flanks when viewed in a longitudinal plane of the threaded portion, i.e. a plane containing the central longitudinal axis of the threaded portion.

According to the present invention, the thread profile of the threading over at least part of the axial extent of the threaded portion is formed of exactly three sub-segments arranged sequentially in the radial direction. By this it is meant that the thread profile in this section of the threading is formed exclusively by the three sub-segments described, to the extent possible by manufacturing techniques, e.g. in some instances a small curved transition is necessitated between the core and the threading, or between each sub-segment. The radially innermost sub-segment therefore begins at the core diameter and the radially outermost sub-segment ends at the lateral surface, with no intervening additional sub-segments positioned between the three sub-segments. In each of the three sub-segments the apical and coronal flank taper towards one another at a constant angle. The taper angle of the radially outermost sub-segment is less than 30°. This provides the radially outermost part of this section of the threading with a sharp cutting profile, thus increasing the ability of the threading to cut into bone, particularly hard bone. Preferably, the angle between the apical and coronal flank in the radially outermost sub-segment is between 20° and 29° and most preferably between 24° and 26°.

While such a narrow angle is beneficial for the cutting performance of the thread, a thread profile having this angle over the full thread depth would have a relatively thin width, even at its radially innermost point. Such a thin thread width would be liable to distortion or breakage.

Therefore, according to the present invention, the middle sub-segment has a taper angle that is greater than the taper angles of the radially innermost and radially outermost sub-segments. In this way, the middle sub-segment provides a greater increase in thread width than would be achieved by maintaining the taper angle of the radially outermost sub-segment, thus increasing the strength of the thread.

Such a thread profile has benefits during insertion into both hard and soft bone. The narrow angle of the radially outermost sub-segment provides a good cutting ability, which is particularly important when the implant is inserted into hard bone. The provision of the middle sub-segment widens the thread at location radially inwards of the sharp cutting angle of the radially outmost sub-segment, thus strengthening the thread as well as providing a greater axial compression of soft bone when the implant is inserted into an underprepared bore hole.

In preferred embodiments the taper angle of the middle sub-segment is at least twice the taper angle of the radially outermost sub-segment. This enables the width of the thread to increase quickly in the radially inwards direction. In a particularly preferred embodiment the taper angle of the middle sub-segment is between 40 and 70°, preferably at least 50°.

The radially innermost sub-segment of the thread profile has a taper angle less than that of the middle sub-segment, resulting in a better cutting function. In a preferred embodiment the taper angles of the radially inner and outermost sub-segments are substantially the same and most preferably these taper angles are identical. By "substantially the same" it is meant that the taper angles of the radially inner and outermost sub-segments are within 5° of one another and by "identical" it is meant that the taper angles are within 1° of one another. This results in both the radially inner and outermost sub-segments comprising a sharp cutting profile.

Therefore, according to a particularly preferred embodiment, within the radially inner and outer most sub-segments the apical and coronal flanks taper towards one another at an angle of between 24-26°, most preferably 25° and within the middle sub-segment the apical and coronal flanks taper towards one another at an angle of between 55-65°, most preferably 60°.

According to the present invention, the above described thread profile is present over at least a section of the axial extent of the threaded portion. In some preferred embodiments, the threading comprises the above described thread profile over the full axial length of the threaded portion. In this way the radially outermost part of the threading will always comprise an angle between the apical and distal flanks of less than 30°. This narrow angle provides an enhanced cutting function along the full length of the threaded portion.

Preferably the base thread profile of the threading and the thread width at the core diameter remain constant along the full axial extent of the threaded portion. As a consequence, in such embodiments, the shape of the apical and coronal flanks remain constant along the axial extent of the threaded portion. Thus, in this preferred embodiment, the base thread profile is formed by the above described three sub-segments. This enables the above described thread profile to be present along the full axial extent of the threaded portion.

However, in preferred embodiments, as will be described below, the thread depth of the threading varies along the axial extent of the threaded portion. In such embodiments it is not always possible for all three sub-segments to be present within the threading along the full axial extent of the threaded portion, as once the thread depth at a particular axial location is reduced beyond a certain point the radially outmost sub-segment, and then the middle sub-segment, will be removed from the thread profile at that axial location.

However, it is preferred that the thread profile of the threading is formed by the above described three sub-segments over at least one quarter of the axial extent of the threaded portion, most preferably over at least half the axial extent of the threaded portion.

Preferably, the thread profile of the threading is formed by the above described three sub-segments at an axial location within the apical most half of the threaded portion, more preferably within the apical most quarter of the threaded portion. By this it is meant that the section of the threading comprising the above described three sub-segments begins within the apical half of the threaded portion, preferably within the apical most quarter of the threaded portion. This is beneficial as it enables the radially outermost sub-segment, with its enhanced cutting function, to be present in an apically located part of the threaded portion.

The threading of the present invention may be a single start thread. However, preferably the threading comprises a double start thread. This is beneficial as such a double thread allows the implant to penetrate deeper into the bone in fewer turns, and thus increases the insertion speed of the implant. In addition, a double start thread is considered to be less harmful for the bone as the cutting edges of each thread are more axially spaced apart. In a double start thread, the pitch of the threading (namely the axial distance between thread peaks) is half the thread lead (namely the axial distance travelled by the implant in one complete 360° turn).

When the implant comprises a double start thread, the thread profile of both threads should comprise the above described three sub-segments, at least over a section of the axial extent of the threaded portion. Preferably, the base thread profile of each thread is identical and constant over the full axial length of the threaded portion, this base thread profile being formed of the above described three sub-segments. This simplifies production of the implant as the same tool can be used to make both threads.

Preferably, the core diameter of the threaded portion tapers radially inwards in the apical direction over at least a section of the axial extent of the threaded portion. The tapered nature of the core diameter enables the implant to compress soft bone when placed in an underprepared bore hole, that is, a bore hole having a diameter less than the core diameter of the threaded portion. As the implant is inserted into the bone, the gradually increasing diameter of the core compresses the soft bone in the radial direction around the threaded portion of the implant.

Preferably the core diameter of the threaded portion tapers radially inwards in the apical direction over at least a substantial section of the axial extent of the threaded portion, i.e. over 80% of the axial length of the treaded portion.

In order to enable soft bone compression over the full axial length of the threaded portion, it is preferable that the core diameter of the threaded portion tapers radially inwards in the apical direction over the full axial length of the threaded portion. In other words the core diameter continually decreases from the coronal to the apical end of the threaded portion.

Additionally or alternatively the outer diameter of the threaded portion may taper radially inwards in the apical direction along at least the apical half of the threaded portion. In this way the lateral surface of the threaded portion can also be used to compress soft bone in the radial direction, at least in the apical half of the threaded portion.

In a particularly preferred embodiment the threaded portion comprises an apical section and a main body section, wherein within apical section the taper angle of the outer diameter, relative to the central longitudinal axis, is always greater than 20°, the taper angle of the core diameter relative to the central longitudinal axis being less than the taper angle of the outer diameter at all axial locations of the apical section, such that the thread depth in the apical section continuously decreases in an apical direction, the apical section having an axial length of less than 2 mm, and wherein within the main body section the taper angle of the outer diameter, relative to the central longitudinal axis, is always less than 5°.

The short length of the apical section and the large taper angle of the outer diameter means that the thread depth increases rapidly close to the apical end of the threaded portion, enabling the implant to cut deeply into the bone and increasing primary stability. Preferably the axial length of the apical section is less than 1.6 mm, most preferably between 1-1.5 mm. It is preferred that the axial length of the apical section is not less than 1 mm as the threading needs some axial space in which to increase its depth in the coronal direction.

In this preferred embodiment, in the main body section of the threaded portion, the taper angle of the outer diameter is always less than 5°, the taper angle being measured from the central longitudinal axis of the threaded portion. By limiting the taper angle in this way, the outer diameter of the main body section increases only very gradually in the coronal direction, thus controlling the torque required during insertion, in particular into hard bone. In addition, having a low taper angle in the main body section increases primary stability as, for a given diameter of bore hole, a larger number of thread peaks can cut into the bore wall. Preferably the taper angle of the outer diameter in the main body section is always less than 2.5°, more preferably less than 1.5° and most preferably less than 1°.

In such embodiments it is preferable that the thread profile of the threading is formed by the above described three sub-segments over at least one quarter of the axial extent of the main body portion, more preferably over at least half the axial extent of the main body section. Additionally or alternatively it is preferred that the thread profile of the threading is formed by the above described three sub-segments at an axial location within the apical most half of the main body section, more preferably within the apical most quarter of the main body section. By this it is meant that the section of the threading comprising the above described three sub-segments begins within the apical half of the main body section, preferably within the apical most quarter of the main body section.

While it is possible to design the implant such that the thread depth remains constant over the axial extent of the main body section, preferably the taper angles of the core diameter and outer diameter within the main body section are such that, over the axial length of the main body section, the depth of the threading varies such that the depth of the threading at the apical end of the main body section is greater than the depth of the threading at the coronal end of the main body section. As, according to the present invention, the thread width narrows in the radially outwards direction, a smaller thread depth results in a wider lateral surface. Therefore, in this preferred embodiment, the width of the lateral surface of the threading at the apical end of the main body section will be less than the width of the lateral surface of the threading at the coronal end of the main body section.

This is beneficial as sharper threads with a greater thread depth in the apical part of the main body section provide a good cutting function and better primary stability, whereas a wider lateral surface in the coronal area of the main body section enables compression of soft bone in the axial direction, again increasing primary stability.

When, in accordance with a preferred embodiment, the base thread profile and the thread width at the core are constant along the full axial extent of the threaded portion, as described above, changes in the width of the lateral surface along the length of the threaded portion will be the result of changes in the thread depth rather than a re-shaping of the apical and coronal flanks.

In a particularly preferred embodiment, within the main body section of the threaded portion, the width of the lateral surface of the threading is never less than 0.08 mm and never greater than 0.45 mm.

The preferred upper and lower limits on the width of the lateral surface of the threading prevent this surface from becoming too narrow (which could result in fracture or distortion of the apical parts of the thread) or too broad (which could lose the cutting function of the thread and increase the insertion torque within hard bone to unacceptable levels). The upper and lower limits on the width of the lateral surface improve the ability of the implant to self tap into hard bone while maintaining insertion torque within acceptable levels.

This is considered inventive in its own right and therefore, viewed from a second aspect, the present invention comprises a dental implant comprising, a threaded portion extending along a central longitudinal axis from an apical end to a coronal end, the threaded portion comprising a core from which threading extends radially outwards, the threading comprising an apical flank, a coronal flank and a lateral surface connecting the apical and coronal flanks, the lateral surface defining the radially outermost surface of the threading, the threading extending along the length of the threaded portion in a helical manner and the thread width narrowing in the radially outwards direction such that the threading is widest where it contacts the core and narrows towards the lateral surface, the base thread profile of the threading and the thread width at the core remaining constant along the axial extent of the threaded portion, the core diameter of the threaded portion being defined by the outer diameter of the core and the outer diameter of the threaded portion being defined by the lateral surface of the threading, wherein the core diameter of the threaded portion tapers radially inwards in the apical direction along the full axial length of the threaded portion and the outer diameter of the threaded portion tapers radially inwards in the apical direction along at least the apical half of the threaded portion, the threaded portion comprising an apical section and a main body section, wherein within the apical section the taper angle of the outer diameter, relative to the central longitudinal axis, is always greater than 20°, the taper angle of the core diameter relative to the central longitudinal axis being less than the taper angle of the outer diameter at all axial locations of the apical section, such that the thread depth in the apical section decreases in an apical direction, the apical section having an axial length of less than 2 mm, and wherein, in the main body section, the taper angle of the outer diameter relative to the central longitudinal axis is always less than 5°, the taper angles of the core diameter and outer diameter within the main body section being such that, over the axial length of the main body section, the depth of the threading varies such that the depth of the threading at the apical end of the main body section is greater than the depth of the threading at the coronal end of the main body section, and the width of the lateral surface of the threading at the apical end of the main body section is less than the width of the lateral surface of the threading at the coronal end of the main body section, wherein the width of the lateral surface of the threading within the main body section is never less than 0.08 mm and never greater than 0.45 mm.

The definitions of terms given above in relation to the first aspect, such as "apical", "coronal", "outer diameter", "thread depth", "thread width", "thread profile" and "base thread profile" are equally valid in respect of the second aspect and all further aspects of the present invention descried herein.

The short length of the apical section and the large taper angle of the outer diameter within the apical section means that the thread depth increases rapidly in the vicinity of the apical end of the threaded portion, enabling the implant to cut deeply into the bone and increase primary stability. Preferably the axial length of the apical section is less than 1.6 mm, most preferably between 1-1.5 mm. It is preferred that the axial length of the apical section is not less than 1 mm as the threading needs some axial space in which to increase its depth in the coronal direction.

According to the second aspect of the present invention, and preferred aspects of the first aspect, the taper angle of the outer diameter within the main body section is always less than 5°, the taper angle being measured from the central longitudinal axis of the threaded portion. By limiting the taper angle in this way, the outer diameter of the main body section increases only very gradually in the coronal direction, thus controlling the torque required during insertion into hard bone. In addition, having a low taper angle in the main body section increases primary stability as, for a given diameter of bore hole, a larger number of thread peaks can cut into the bore wall. Preferably the taper angle of the outer diameter in the main body section is always less than 2.5°, more preferably less than 1.5° and most preferably less than 1°.

As discussed above, the "base thread profile" of the threading refers to the shape of the apical and coronal flanks. According to the second aspect of the present invention, and preferred aspects of the first aspect, the base thread profile of the threading and thread width at the core remain constant, such that the change in the width of the lateral surface along the length of the main body section is the result of changes in the thread depth rather than a re-shaping of the apical and coronal flanks. The lateral surface will be wider at areas of the threading where the thread depth is small and narrower where the thread depth is greater. This is due to the fact that the thread width narrows in a radially outwards direction.

According to the second aspect of the present invention, the thread width narrows in the radially outwards direction such that the thread is widest where it contacts the core and narrows towards the lateral surface. Within the implant field many such thread profiles are known. In many known designs the coronal and apical flanks of the threading are asymmetric. For example, the coronal flank may taper over a radius while the apical flank may taper over a single angle. Alternatively both flanks may taper over different radii or angles.

In the second aspect of the present invention however it is preferred that both the apical and coronal flanks of the threading taper over an angle rather than a radius. In other words, the apical and coronal flanks have a straight cross-section in a longitudinal plane of the threaded portion.

Preferably, over at least a section of axial extent of the main body section the angle formed between the apical and coronal flanks, at least in the radially outermost part of the threading, is less than 30°, more preferably between 20° and 29° and most preferably between 24° and 26°. This provides the threading over this axial extent with a sharp cutting profile, thus increasing the ability of the threading to cut into bone, particularly hard bone.

In some embodiments of the second aspect of the present invention the apical and coronal flanks form a single angle along the full depth of the thread. However, at the preferred angles listed above, this will result in a thread having a relatively thin width, even at its radially innermost point. Such a thin thread width would be liable to distortion or breakage.

Preferably therefore, the base thread profile of the second aspect of the present invention is formed by the three sub-segments described in relation to the first aspect of the present invention. Specifically, it is preferred that the base thread profile of the threading of the second aspect of the present invention is formed of exactly three sub-segments arranged sequentially in the radial direction, wherein in each sub-segment the apical and coronal flank taper towards one another at a constant angle, the middle sub-segment having a taper angle that is greater than the taper angles of the radially innermost and radially outermost sub-segments, the taper angle formed between the apical and coronal flanks in the radially outermost sub-segment being less than 30°.

Preferably the thread depth of the threading is such that, over at least a section of the axial extent of the main body section the thread profile is formed of exactly three sub-segments arranged sequentially in the radial direction, wherein in each sub-segment the apical and coronal flank taper towards one another at a constant angle, the middle sub-segment having a taper angle that is greater than the taper angles of the radially innermost and radially outermost sub-segments, the taper angle formed between the apical and coronal flanks in the radially outermost sub-segment being less than 30°.

In other words, it is preferable that the first and second aspects of the present invention are combined, such that the threading of the second aspect of the present invention has the features, and preferably the preferred features, of the threading as described in relation to the first aspect of the present invention.

In particular, it is preferable that the thread profile of the threading of the second aspect of the present invention is formed by the above described three sub-segments over at least one quarter of the axial extent of the main body portion, more preferably over at least half the axial extent of the main body section.

Additionally or alternatively it is preferred that the thread profile of the threading of the second aspect of the present invention is formed by the above described three sub-segments at an axial location within the apical most half of the main body section, more preferably within the apical most quarter of the main body section. By this it is meant that the section of the threading comprising the above described three sub-segments begins within the apical half of the main body section, preferably within the apical most quarter of the main body section.

The features described below are equally applicable to both the first and second aspect of the present invention.

According to at least preferred embodiments of the present invention, the taper angle of the outer diameter in the apical section of the threaded portion is always greater than 20°. This results in the outer diameter of the apical section increasing rapidly over a short axial length. Preferably the maximum taper angle of the core diameter within the apical section, as measured from the central longitudinal axis of the threaded portion, is between 10° and 25°.

Preferably the taper angle of the outer diameter is not constant within the apical section, although this is always greater than 20°. Preferably the threading comprises two adjoining segments within the apical section, each segment having an outer diameter that tapers at a constant angle relative to the longitudinal axis of the threaded portion, the outer diameter of the apical most segment having a greater taper angle, as measured from the central longitudinal axis, than the outer diameter of the coronal most segment. Having a greater taper angle in the apical most segment causes the thread depth to very quickly increase in the coronal direction before increasing at a gentler amount, thus creating a more rounded apical section.

Preferably the taper angle of the outer diameter of the apical most segment is between 50° and 70°, most preferably 60°, while the taper angle of outer diameter of the coronal most segment is between 28° and 48°, the taper angles being measured relative to the central longitudinal axis.

The result of the preferred relative taper angles of the core and outer diameters within the apical section is that the depth of the thread quickly increases in the coronal direction. Preferably the maximum thread depth of the threading is reached within less than one full turn of the threading, most preferably within three quarters of one full thread turn. This allows the apical part of the implant to cut deeply into the bone.

According to at least preferred embodiments of the present invention, the core diameter tapers in the apical direction over the full axial length of the threaded portion. The tapered nature of the core diameter enables the implant to compress soft bone when placed in an underprepared bore hole. In addition, at least in preferred embodiments, the outer diameter of the threaded portion tapers radially inwards in the apical direction along at least the apical half of the threaded portion. This tapering of the outer diameter also compresses the soft bone in the radial direction around the threaded portion of the implant.

Preferably the outer diameter tapers radially inwards over at least the apical half of the main body section. It is possible for the outer diameter to taper over the full length of the main body section, in a similar manner to the core diameter. However, preferably the outer diameter of the threaded portion remains constant in the coronal most part of the main body section, such that the lateral surface in this part of the main body section defines a cylindrical surface. Preferably the lateral surface of the threading defines a cylindrical surface over no more than the coronal most 2 mm of the main body section. Most preferably the axial extent of the main body section having a constant outer diameter is between 0.5 mm and 2 mm.

Having a constant diameter in the coronal most part of the main body section controls the insertion torque needed during placement in hard bone, by reducing the total increase in outer diameter over the main body section. Often the outer layer of bone, known as the cortical bone, is denser than the underlying bone, and hence it is especially important to prevent an increase of torque in this area. Maintaining a cylindrical outer diameter in the coronal most part of the main body section assists with this.

According to at least preferred embodiments of the present invention, the taper angle of the outer diameter relative to the central longitudinal axis along the axial extent of the main body section is always less than 5°. As discussed above, in the coronal most part of the main body section the taper angle of the outer diameter can be 0°, thus defining a cylindrical surface. However, according to at least preferred embodiments of the present invention, the outer diameter of the threaded portion must taper radially inwards in the apical direction over the apical most half of the threaded portion, preferably the apical most half of the main body section.

Thus in preferred embodiments, the outer diameter of the main body section comprises an apical segment, in which the outer diameter tapers radially inward in the apical direction with a taper angle of less than 5° relative to the central longitudinal axis, preferably less than 2.5°, and a coronal segment, in which the outer diameter has a taper angle of 0°, thus defining a cylindrical surface in the coronal most part of the main body section. In the apical segment the taper angle of the outer diameter can vary, thus forming sub-segments within the apical segment having different taper angles of greater than 0°. However, in preferred embodiments, the outer diameter of the apical segment of the main body section has a constant taper angle. Preferably this taper angle is less than 2.5°, more preferably less than 1.5° and most preferably less than 1°. Preferably the coronal segment has an axial length of no more than 2 mm, most preferably an axial length of between 0.5 and 2 mm.

Therefore, in a preferred embodiment, the outer diameter of the main body section tapers at a constant angle, relative to the central longitudinal axis of the threaded portion, from the apical end of the main body section to an axial location no more than 2 mm from the coronal end of the main body section, after which the outer diameter remains constant.

As mentioned above however it is also possible for the outer diameter of the main body section to taper radially inwards in the apical direction over the full axial extent of the main body section. In such embodiments the taper angle of the outer diameter, measured relative to the central longitudinal axis of the threaded portion, can vary over the axial extent of the main body section, while remaining less than 5°. Preferably however in such embodiments the taper angle of the outer diameter is constant over the full axial extent of the main body section. Preferably this taper angle is less than 2.5°, more preferably less than 1.5° and most preferably less than 1°.

In order to ensure that the width of the lateral surface of the threading remains within the upper and lower limits defined by the present invention, the thread depth must be controlled. This is preferably achieved by adjusting the core and outer diameters. As discussed above, it is preferable that, within the main body section, the taper angle of the outer diameter is always less than 5°. This is because the lateral surface of the threading will be driven into hard bone, without pre-tapping of the borehole. Therefore the tapering of the outer diameter, where present, must be gentle and ideally over a constant taper angle so as to avoid any sudden changes in torque during insertion.

The core diameter however, is not so restricted. This is because, in cases of hard bone, a bore hole will be drilled which is greater than the maximum core diameter of the threaded portion. Consequently, the insertion torque experienced in hard bone will not typically be affected by changes in core diameter. Instead, the taper of the core diameter will only affect insertion of the implant in soft bone, when the bore hole is underprepared and when compression of the bone is desirable.

Therefore, changes to the core diameter can be made in order to control the width of the lateral surface of the threading.

Preferably therefore, within the main body section, the core comprises at least two adjacent segments, the core diameter of each segment tapering at a different angle relative to the central longitudinal axis of the threaded portion. Therefore, although the core diameter of the main body section continuously widens in the coronal direction, it does so in an uneven manner. In this way the lateral width of the threading can be maintained within the above defined range.

In some preferred embodiments the core comprises exactly two adjacent segments, in other preferred embodiments exactly three adjacent segments and in other preferred embodiments exactly four adjacent segments. In some embodiments the taper angles of the core segments, measured relative to the central longitudinal axis, may sequentially increase in the coronal direction, such that the rate of increase of the core diameter increases sequentially in the coronal direction over the axial length of the main body section. This is particularly preferred in embodiments in which the core comprises exactly two or three segments in the main body section.

In other embodiments however one core segment may be bordered in both the apical and coronal directions by a core segment having a smaller taper angle, as measured relative to the central longitudinal axis. In such embodiments therefore the rate of increase of the core diameter increases and then decreases in the coronal direction. This is particularly preferred in embodiments in which the core comprises exactly four segments.

In yet further embodiments the taper angles of the core segments, measured relative to the central longitudinal axis, may sequentially decrease in the coronal direction, such that the rate of increase of the core diameter decreases sequentially in the coronal direction over the axial length of the main body section. This is preferred in some embodiments in which the core comprises exactly two segments in the main body section.

The changes in taper angle of the core diameter within the main body section are chosen in order to maintain the lateral surface width of the threading within the predefined upper and lower limits of the present invention and in addition to maintain a minimum implant wall thickness, as will be discussed further below.

As discussed above, at least in preferred embodiments of the present invention, the thread depth at the apical end of the main body section is greater than the thread depth at the coronal end of the main body section while the width of the lateral surface of the threading is narrower at the apical end of the main body section than at the coronal end of the main body section.

This results in a general trend of the width of the lateral surface increasing over the axial extent the main body section in the coronal direction. This increase in lateral surface width enables soft bone to be compressed in the axial direction around the threading, thus assisting the primary stability of the implant.

As mentioned above however, while bone compression is beneficial in cases of soft bone, it is to be avoided in hard, dense bone. In such cases the bore hole is not underprepared but instead is drilled to be greater than the core diameter of the threaded portion across the full axial length of the threaded portion. In such cases only the radially outer parts of the threading engage the bone during insertion.

As the implant of preferred embodiments of the present invention is driven into dense bone, the threading initially cuts a groove into the bone corresponding to the thread shape at the apical end of the implant. As the implant is driven further into the bone, this initial groove is gradually widened in both the axial direction, as the lateral surface widens, and radial direction, as the outer diameter increases. In this way, the groove within the bone is formed incrementally, ensuring that the insertion torque is not too great while at the same time providing a firm fixation within the bone. In at least preferred embodiments of the present invention, the thread profile, at least in the apical most quarter, preferably the apical most half of the main body section, is formed by the above described three sub-segments. The radially outermost sub-segment has a taper angle between the apical and coronal flanks of less than 30°, which provides an enhanced cutting action, which is particularly beneficial in hard bone. As described above, the middle sub-segment strengthens the threading and increases the compression provided to soft bone in under-prepared bore holes. Furthermore, maintaining the lateral surface width of the threading within the main body section within the range of 0.08-0.45 mm prevents this surface from becoming too narrow (which could result in fracture or distortion of the apical parts of the thread) or too broad (which could lose the cutting function of the thread and increase the insertion torque within hard bone to unacceptable levels). Therefore, these preferred features combine in an advantageous manner.

According to a particularly preferred embodiment, in the main body section at every axial location the taper angle of the core diameter is greater than the taper angle of the outer diameter, such that the thread depth in the main body section continuously increases in the apical direction and the width of the lateral surface continuously increases in the coronal direction. This enhances the above described incremental formation of the groove within the bone as well as the compression of soft bone in both the axial and radial direction.

As discussed above, in certain preferred embodiments, within the main body section, the core comprises at least two adjacent segments, the core diameter of each segment tapering at a different angle relative to the central longitudinal axis of the threaded portion. Preferably the taper angle of each core segment is at least twice the maximum taper angle of the outer diameter in the main body section. This provides for a better compression of the bone in underprepared bore holes.

In some embodiments the threaded portion of the implant consists solely of the apical portion and the main body portion. In other words the coronal end of the threaded portion corresponds to the coronal end of the main body section. Usually however, the threaded portion comprises, at its coronal end, a thread run out section in which the outer diameter tapers radially inwards in the coronal direction such that, at the coronal end of the run out section, the outer diameter is equal to the core diameter. It is preferable that this run out section is as short as possible and therefore, where present, the runout section preferably has an axial length of no greater than 1.5 mm, most preferably 1 mm or less. Viewed in another way therefore, it is preferable that the main body section of the threaded portion extends from the coronal end of the apical section to a point no further than 1.5 mm, preferably 1 mm or less, from the coronal end of the threaded portion.

Preferably the taper angle of the outer diameter within the runout section, as measured from the central longitudinal axis of the threaded portion, is constant along the full axial length of the run out section and is preferably between 20° and 46°.

In order to provide a cutting edge within the threading at least one flute is preferably provided in the threaded portion.

Preferably the threaded portion comprises at least two flutes which extend in a helical manner along the full length of the threaded portion. In this way cutting edges are provided along the full length of the threaded portion. The helical nature of the flutes enables bone chips to be transported and distributed along the length of the threaded portion. In one embodiment the threaded portion comprises only two flutes, which are diametrically opposed to one another. This ensures an adequate volume of threading is maintained, particularly in smaller diameter implants, in order to provide primary stability within the bone. However in other preferred embodiments, particularly in implants having a maximum outer diameter in the threaded portion of at least 5 mm, the threaded portion may comprise four flutes equally spaced about the central longitudinal axis of the threaded portion.

Preferably the at least one flute extends into the core of the threaded portion. In this way each flute forms a continuous channel over the length of the threaded section for bone chip transport. Preferably the cross-section of the flute, in a plane perpendicular to the central longitudinal axis, forms a circular arc. This provides a large volume for bone chip transport. In order to increase the cutting ability of the flute(s) however, it is preferred that the cross-section of the flute(s) within the threading further comprises two opposing straight section located adjacent to the radially outer ends of the circular arc, said straight sections tapering towards one another in the radially outwards direction. In this manner, the straight sections form undercuts in the thread, which creates a more aggressive cutting edge. The fact that the flute comprises straight sections on both sides of the circular arc means that the flute provides the same cutting ability regardless of the direction of rotation of the implant. This is beneficial for exact placement of the implant, for example if the dentist over inserts the implant and wishes to partially unscrew the implant from the bone. In addition, this flute design can help to reduce torque during insertion of the implant, which is particularly beneficial when inserting the implant into hard bone. As the implant is inserted into the bore hole, if the insertion torque rises to a level considered unacceptable by the surgeon, s/he can turn the implant slightly in the opposite direction. This action will cause the opposing cutting surface of the flute to cut into the bone, slightly widening the threads already tapped by the implant. The surgeon can then resume insertion of the implant at a lower torque than previously and with less pressure on the bone.

The taper angle between the two opposing straight sections of the flute is preferably between 20 and 65°, most preferably 20-30° or 55-65°. A sharper angle is beneficial in implants having a smaller diameter in order to retain thread volume, which is beneficial for primary stability, and therefore preferably the two opposing straight sections of the flute taper towards one another at an angle of 55-65° in implants having a maximum outer diameter in the threaded portion of less than 4.5 mm.

It is to be noted that the opposing straight sections of the flute may be located at the same axial location within the threading or at different axial locations, depending on the relative helix angles of the threading and flute, the width of the threading and the flute design. According to the preferred embodiment however, the two opposing straight sections of the flute are both present, together or axially spaced from one another, within at least a portion of the threading cross-section.

As discussed above, according to at least preferred embodiments of the present invention the depth of the thread generally, and in particularly preferred embodiments continuously, decreases in the coronal direction along the main body section of the threaded portion. Therefore, depending on the length of the straight sections, the undercut may not be present along the full length of the threading. Preferably, the above described straight sections are present in the threading over 15-100% of the axial length of the main body section, more preferably over at least 50% of the axial length of the main body. Preferably, in situations in which the undercut is not present over 100% of the threading in the main body section, the undercut is present at the apical part of the main body section. It is the apical part of the threaded section which will need to have the greatest cutting ability and therefore it is this area of the implant which benefits most from the inclusion of the flute undercut.

As described above, in a preferred embodiment, the cross-section of the flute within at least a portion of the threading comprises a circular arc and, adjacent to each end of the circular arc, opposing straight sections which taper towards one another in the radially outwards direction. As a result of this cross-section, in some embodiments the leading edge of the cutting surface is located at the outer diameter of the implant.

However, it has surprisingly been discovered that it is beneficial to provide a smooth rather than sharp transition between the lateral surface of the threading and the flute.

This smoothing of the flute edge has benefits in relation to the interaction of the implant threads with both hard and soft bone.

The smoothing of the transition between the lateral surface and the flute has the effect of moving the leading cutting edge of the flute radially inwards of the outer diameter by a small amount and in addition creating a curved transition surface joining the cutting edge to the lateral surface of the thread.

This curved transition surface, when brought into contact with soft bone, guides and compresses the bone radially outwards. Therefore, rather than this bone being cut away by the sharp cutting edge of the flute, it instead forms part of the bone mass which is compressed around the implant, improving primary stability. When inserted into hard bone however, this bone will not compress and hence is contacted and cut by the leading edge within the flute.

This ability of the flute to cause different results in hard and soft bone is particularly beneficial as the bone density within the human jaw tends not to be homogenous. Instead, pockets of hard bone can be found within soft bone and vice versa. The drilling protocol of the surgeon will be selected based on the general bone density of the patient. When the bone is classified as soft bone s/he will underprepare the bore hole, while if the bone is classed as hard a wider diameter bore hole will be used to prevent compression of the hard bone and to reduce the torque needed during insertion. Using the above described inset cutting edge and curved transition surface, the transition surface can compress areas of soft bone while the cutting edge removes areas of hard bone. In the case of hard bone it enables any soft bone encountered to be compressed, thus increasing primary stability, without sacrificing the cutting ability of the thread.

Therefore, preferably, the cross-section of the flute within at least a portion of the threading comprises a circular arc and, adjacent each end of the circular arc, opposing straight sections which taper towards one another in the radially outwards direction, and, adjacent each straight section, transition surfaces which connect the radially outer ends of the straight sides to the lateral surface of the threading, the lateral surface of the threading having a greater radius than the outer end of the straight sections such that the leading cutting edge of the flute is located radially inward of the lateral surface. Preferably the transition surfaces are rounded.

This is considered inventive in its own right and therefore, viewed from a third aspect, the present invention provides a dental implant comprising a threaded portion extending along a central longitudinal axis from an apical end to a coronal end, the threaded portion comprising a core from which threading extends radially outwards, the threading comprising an apical flank, a coronal flank and a lateral surface connecting the apical and coronal flanks, the lateral surface defining the radially outermost surface of the threading, the threading extending along the length of the threaded portion in a helical manner and the thread width narrowing in the radially outwards direction such that the threading is widest where it contacts the core and narrows towards the lateral surface, the core diameter of the threaded portion being defined by the outer diameter of the core and the outer diameter of the threaded portion being defined by the lateral surface of the threading, wherein the threaded portion comprises at least one flute which extends in a helical manner along the full length of the threaded portion, the cross-section of the flute within at least a portion of the threading comprising a circular arc and, adjacent each end of the circular arc, opposing straight sections which taper towards one another in the radially outwards direction, and, adjacent each straight section, transition surfaces which connect the radially outer ends of the straight section to the lateral surface of the threading, the lateral surface of the threading having a greater radius than the outer end of the straight sections such that the leading cutting edge of the flute is located radially inward of the lateral surface.

Preferred features of this aspect of the invention are the same as described above and below in relation to the first and second aspects of the invention. In other words, all described features of the thread profile, thread base profile, width of the lateral surface and taper angles of the core and outer diameters described above can be applied, either in isolation or in combination to this new aspect of the present invention.

The above described rounding of the flute edges can also be applied in areas of the threading where no straight sections of the flute are present. While the cutting ability of the flutes in such areas is not as great as those areas of the flutes having straight sections, nonetheless the inclusion of a transition surface will still have the effect of moving the cutting edge radially inwards and thus provide, to some extent, the benefits described above. Therefore, in embodiments in which the straight sections of the flute are not found over 100% of the axial length of the threaded portion, it is preferred that the cross-section of the at least one flute in the remaining portions of the threading comprise a circular arc and, adjacent each end of the circular arc, transition surfaces which connect the radially outer ends of the arc to the lateral surface of the threading, the lateral surface of the threading having a greater radius than the outer ends of the arc such that the leading cutting edge of the flute is located radially inward of the lateral surface.

According to preferred embodiments of the invention, the threaded portion comprises a roughened surface. A roughened surface increases the surface area available for osteoblasts to attach to and therefore has long been known to be beneficial in dental implants. One common form of surface roughening involves sand blasting and/or acid etching of the implant surface. This process removes material from the implant surface, leaving depressions and pits at a microscopic and/or nanoscopic level. Additive methods of surface roughening, such as TPS (titanium plasma spray), are also known. Any known method of surface roughening can be applied to the threaded portion of the present invention. Preferably the threaded portion of the implant is roughened using a method comprising both sand blasting and acid etching.

The implant design described above can be used on both one-piece and two part implants. Therefore in some embodiments the implant is a one-piece implant and comprises, coronal of the threaded section, an integral, monolithic abutment part, which in use protrudes through the gum to provide support for a dental prosthesis.

In other embodiments however the implant is the implant part of a two-piece implant and therefore comprises abutment connection geometry for connecting a separate abutment to the implant. Any known abutment connection geometry can be used in conjunction with the present invention. For example, the implant can comprise a blind bore extending from the coronal end of the implant along the longitudinal axis. The bore can be used to accommodate the apical end of an abutment or other component, such as a healing cap or impression coping. Preferably the blind bore comprises threading along at least a part of its length. This enables the abutment or other component to be connected to the implant via screw connection. The abutment or other component can itself comprise a threaded post for fastening to the implant bore or a separate basal screw can be used.

Additionally or alternatively, the implant may comprise an anti-rotation means. The anti-rotation means may be formed within the blind bore, where present, or separately to this. For example, the anti-rotation means may protrude from the coronal end of the implant.

The anti-rotation means comprises a section of the implant which has a non-rotationally symmetric cross-section in a plane perpendicular to the central longitudinal axis of the anti-rotation means, which in preferred embodiments is co-axial with the central longitudinal axis of the threaded portion. The anti-rotation means is designed for cooperation with a complementary anti-rotation means formed on an abutment, other component or surgical tool, such as an insertion tool. The anti-rotation means of the implant can be formed in the blind bore, where present, in which case the cooperating component or tool comprises a complementary shaped protrusion for inserting into the bore. Alternatively the anti-rotation means of the implant can comprise an axially extending boss shaped for accommodation in a complementary shaped cavity in the abutment, other component or tool. Once the protrusion is housed within the bore, or the boss within the cavity, it is not possible for the components to be rotated relative to one another. This enables torque to be transferred to the implant during insertion of the implant, and later for the abutment or other component to be held in a fixed rotational orientation relative to the implant.

The cross-section of the anti-rotation means of the implant, whether formed by a bore or a boss, can have any known shape. For example, it may be polygonal, such as hexagonal or octagonal, or comprise a number of grooves or protrusions, for example, four protrusions evenly spaced about the longitudinal axis. One particularly preferred shape is a sinusoidal curve forming a series of rounded, sequential grooves and protrusions about the longitudinal axis.

In preferred embodiments the implant comprises a blind bore extending from the coronal end of the implant along the central longitudinal axis of the threaded portion, the blind bore comprising an anti-rotation means having a non-circular-symmetric cross-section in a plane perpendicular to the central longitudinal axis and, apical of said anti-rotation means, a threaded section. Preferably the blind bore further comprises, coronal of the anti-rotation means, a conical portion tapering radially outwards in the coronal direction. Such a tapered portion can form a secure seal with a complementary shaped abutment, thus preventing bacteria from entering the implant.

Regardless of the shape of the blind bore, when such a blind bore is present in the implant and extends into the threaded portion, the above described taper angle(s) of the core diameter should be selected to ensure a suitable wall thickness is maintained about the blind bore, in addition to maintaining the lateral surface width of the threading within the preferred defined limits. A suitable wall thickness will be defined in part by the material of the implant and can be calculated by the skilled person.

When the implant of the present invention is a two-piece implant, it can be a bone level or tissue level implant. That is to say, the implant can be designed to be inserted to the level of the alveolar crest (bone level) or to extend a few millimetres into the soft tissue (tissue level).

Regardless of whether the implant is a bone or tissue level implant, or a one-piece implant, the threaded portion described above remains identical. Preferably the threaded portion is located at the apical end of the implant, most preferably the apical end of the threaded portion is located with 0.5 mm of the apical end of the implant.

When the implant is a bone level implant the threaded portion may extend to the coronal end of the implant. Thus, in some embodiments the main body section of the threaded portion may extend from the coronal end of the apical section of the threaded portion to a point no further than 1.5 mm, preferably 1 mm or less, from the coronal end of the implant.

Preferably however, the implant comprises a neck portion coronal of the threaded portion. The threading of the threaded portion does not extend into the neck portion, although it is possible that this neck portion comprises some other form of threading, such as micro-threading. Any threading found in the neck portion differs from the threading of the threaded portion in at least one of, preferably all of, profile, width, depth, orientation and pitch. In particular the maximum thread depth of the micro-threading is not more than 0.2 mm.

The neck portion is preferably circular cylindrical with an external diameter which is less than the maximum outer diameter of the threaded portion. The external diameter of the neck portion is the outer diameter of the neck portion, including any threading or other surface markings which may be present.

In certain preferred embodiments, the maximum outer diameter of the threaded portion is located at the coronal end of the main body section and therefore in preferred embodiments the external diameter of the neck portion is less than the outer diameter of the coronal end of the main body section.

This reduction in the diameter of the implant coronal of the threaded portion is beneficial as the outer layer of bone, called the cortical layer, is usually denser than the underlying bone. Therefore, even in cases in which the overall bone quality of a patient is soft and thus will benefit from under-preparation of the bore hole and resulting compression, the cortical bone at the surface of the jaw bone should not be compressed. Creating a narrow neck portion above the threaded portion ensures that the bone in this upper area is not compressed. Furthermore, a narrow neck portion prevents the need for this cortical bone to be removed by a so-called profile drill, which is often used in traditional implant placement to enable a wider neck portion to be inserted into the cortical bone. The coronal surface of the jaw bone is often narrow. In order to provide proper nourishment to the bone a width of approximately 1 mm should remain around the bore hole.

Having a narrow neck portion assists in retaining bone at the mouth of the bore hole.

Preferably the change in diameter between the maximum outer diameter of the threaded portion and the external diameter of neck portion is between 0.25 and 2.5 mm.

The neck portion may be smooth or comprise micro-threading, as discussed above. Alternatively it may comprise a series of concentric grooves or protrusions.

In one preferred embodiment the neck portion comprises two axially arranged, adjacent sections. The apical neck section, which lies directly adjacent to the coronal end of the threaded portion, comprises one or more circumferentially extending groove which extends 360° about the longitudinal axis. The groove may also extend axially, in which case it forms a helical thread. Where two or more such grooves are present these may have the same or different helix angles and/or directions. Alternatively a plurality of axially spaced annular grooves may be present. The at least one groove has a depth of less than 0.2 mm, preferably less than 0.1 mm and most preferably approximately 0.05 mm. These grooves increase the surface area of the apical section of the neck portion, thus increasing the area available for osseointegration. When the groove forms a helical thread this can preferably further include one or more flute for providing an additional cutting function.

The coronal neck section, in contrast to the apical neck section, does not comprise any grooves or threading. This section is therefore smoother than the apical neck section. This is beneficial in case of any bone resorption after implantation. In the event of bone loss it is beneficial that the area of implant exposed by this loss has a smoother surface in order to enable this to be cleaned. Therefore, in this preferred embodiment the grooves found in the apical section neck of the neck portion do not extend over the full axial extent of the neck portion.

The neck portion is preferably roughened in the same manner as the threaded portion, e.g. by sand blasting and/or acid etching.

The above described neck portion preferably has an axial length of no more than 2.5 mm, most preferably no more than 2 mm. This ensures that, when the implant is a bone level implant, the majority of the implant is formed by the threaded portion and hence comprises the above described threading for improving primary stability and ease of insertion. When the neck portion comprises the apical and coronal sections described above, it is preferable that the axial lengths of both sections are substantially the same.

The above described neck portion can be present on a bone-level implant. In such cases the implant preferably comprises, coronal of the neck portion, a beveled part which tapers radially inwards in the coronal direction to form a truncated cone. The beveled part provides for a more stable connection to a secondary part, such as an abutment. Further, the beveled part may also advantageously provide for a better sealing with the secondary part.

In some preferred embodiments, the beveled part forms an angle of 17 to 27 degrees, more preferably an angle of 20 to 24 degrees and most preferably an angle of 22.5 degrees with respect to a plane that is perpendicular to the central longitudinal axis of the implant. In other preferred embodiments the beveled part forms an angle of 40 to 50°, more preferably 45° with respect to a plane that is perpendicular to the central longitudinal axis of the implant.

In certain preferred embodiments, the implant includes at its coronal end a flat shoulder which defines the coronal end of the dental implant. The flat shoulder lies preferably on a plane which is perpendicular to the central longitudinal axis of the implant. The flat shoulder can act as an axial stop and/or a centering platform for abutments or other components, such as an insertion tool, which may be attached to the implant during use. Further, the flat shoulder is preferably relatively narrow, e.g. less than 0.5 mm, most preferably less than 0.2 mm in width. The shoulder width is preferably uniform about the entire circumference of the dental implant.

In particularly preferred embodiments the implant comprises both a beveled part and a flat shoulder as described above. In such embodiments the flat shoulder preferably defines the coronal end of the implant and is preferably directly adjacent to the beveled part. As described above, the flat shoulder lies preferably on a plane which is perpendicular to the central longitudinal axis of the dental implant. Further, the flat shoulder is preferably relatively narrow as compared to the beveled part. Along a radius extending from the central longitudinal axis of the implant preferred ratios of the radial width of the flat shoulder to the radial width of the projection of the beveled part on the radius are from 1:5 to 1:20. In other words, the radial width of the projection of the beveled part is between 5 and 20 times the length of the radial width of the flat shoulder.

In contrast to the threaded and neck portions, the bevelled part and flat shoulder, where present, are preferably not roughened. These parts are preferably smoother than the threaded and neck portions, most preferably polished in order to enable a good seal with the cooperating component.

The implant of the present invention may also be a tissue level implant. In such cases the implant further comprises, coronal of the threaded portion, a head portion arranged to extend, in use, into the soft tissue of a patient.

The apical end of the head portion may be directly adjacent to the coronal end of the threaded portion. In such embodiments the apical end of the head portion preferably has a diameter equal to or less than the core diameter of the coronal end of the threaded portion.

Preferably however, tissue level implants according to the present invention comprise the neck portion as described above. Said neck portion is located between and adjacent to the threaded portion and the head portion and may comprise any and all of the preferred features discussed above.

In such embodiments the diameter of the apical end of the head portion is preferably equal to the diameter of the coronal end of the neck portion such that the neck portion smoothly transitions into the head portion.

In some embodiments the head portion may be circular cylindrical. This is particularly beneficial in implants having a maximum outer diameter in the threaded portion of less than 5.0 mm. Preferably however the head portion comprises a flared out section which extends radially outward in the coronal direction, wherein the diameter of the coronal end of the flared out section is greater than the maximum outer diameter of the threaded section. This increase in diameter mimics the shape of a natural tooth within the gingiva and provides a wider platform on which the abutment can rest.

The flared out section can take the form of a truncated cone, such that cross-sections taken in all planes containing the central longitudinal axis of the flared out section, herein referred to as the "longitudinal cross-section", would show the flared out section having a straight, tapered cross-section. However, in other embodiments the flared out section preferably tapers radially outwards in the coronal direction over a radius, thus creating a curved longitudinal cross-section. In preferred embodiments the radius of curvature of the flared out section is between 1 mm and 4 mm. In general, the greater the axial length of the flared out section the greater the radius of curvature. Therefore, in embodiments in which the length of the flared out section is 1.5 mm or less, the radius of curvature is preferably 2 mm or less, most preferably between 0.5 mm and 1.5 mm. In embodiments in which the length of the flared out section is greater than 1.5 mm, the radius of curvature is preferably between 3 mm and 4 mm, most preferably 3.5 mm.

In some embodiments the flared out section may comprise both a curved and a straight, tapered cross-section. In such embodiments the apical end of the flared out section will preferably taper radially outwards over a radius before continuing to flare outwards in a conical manner; namely, with a straight, tapered cross-section.

Where present the flared out section preferably forms the apical end of the head portion. However, it is also possible for the head section to comprise a circular cylindrical section apical of the flared out section. Such a circular cylindrical section can provide the surgeon with more flexibility in the axial placement of the implant, as the implant can be placed deeper within the bone without the increase in torque which would occur should the surgeon attempt to insert the flared out section into the bone.

In addition or alternatively to the flared out section, the head portion may comprise an annular groove or undercut in its external surface. This creates a recessed area in the implant surface which allows for ingrowth of soft tissue. The growth of soft tissue over the interface between the implant surface and the bone provides protection for this interface and can assist with osseointegration of the implant. Preferably this groove is located in the apical half of the head portion.

Regardless of the geometry of the head section, in particular whether or not this comprises a flared out section, the head section preferably comprises, at its coronal end, the beveled part and/or flat shoulder described above. Therefore, in a particularly preferred embodiment the coronal end of the head section comprises a flat shoulder and, apically adjacent to this shoulder the above described beveled part. The beveled part can have the same angles as described above. However, in relation to implants comprising a flared out section is it particularly preferable that the beveled part forms an angle of 40 to 50 degrees, more preferably an angle of 42 to 47 degrees and most preferably an angle of 45 degrees with respect to a plane that is perpendicular to the central longitudinal axis of the dental implant.

The surface of the head portion is preferably smooth. More generally, the head portion preferably has a smoother surface than the threaded portion and, where present, the neck portion. In a particularly preferred embodiment the surface of the threaded and, where present, neck portion are sandblasted and/or acid etched. In contrast, the head portion does not undergo the same surface treatment and therefore has a visually distinct surface texture to the threaded and, where present, neck portion. Most usually, the roughened surface of the threaded portion and, where present, neck portion appears darker than the head portion. While it is possible for the head portion to undergo an alternative surface treatment, or to comprise visually distinct micro-threading or other grooves, most preferably the head portion is smooth, most preferably polished.

Preferably, when the implant comprises the above described neck portion and/or head portion these portions are co-axial with the threaded portion such that the implant as a whole extends along the central longitudinal axis of the threaded portion. In other embodiments however one or more of these portions, in particular the head portion, may extent along a central longitudinal axis that is angled relative to the central longitudinal axis of the threaded portion. When the implant of the present invention is a one-piece implant, the abutment portion of this implant may also extend either co-axial to or at an angle to the longitudinal axis of the threaded portion.

The implant of the present invention can be made from any known, suitable implant material. Preferably the implant is made from titanium, a titanium alloy or zirconia.

Dental implant manufacturers typically sell a range of implants, having different diameters and lengths in order to best fit the individual needs of a patient. Usually the dentist will choose the longest and widest implant possible that will fit within the space in the bone, and this will depend on the position of the missing tooth, condition of the jaw bone, etc.

The implant design according to the present invention is suitable for use over a range of lengths and diameters, as well as for one-piece, bone-level and tissue-level implants.

Therefore, viewed from a further aspect the present invention comprises a plurality of dental implants, each implant comprising the features described above, and preferably the preferred features, in relation to one or more of the first to third aspects of the invention, at least two of the plurality of implants having different maximum outer diameters of threaded portion, within the range from 3 mm-8 mm, and at least two of the plurality of implants having different axial lengths, within the range from 5 mm to 25 mm.

In particular, according to one aspect of the present invention there is provided a plurality of implants according to the second aspect of the present invention, at least two of the plurality of implants having different maximum outer diameters of threaded portion, within the range from 3 mm-8 mm and at least two of the plurality of implants having different axial lengths, within the range from 5 mm to 25 mm.

In order to ensure that, in each of the plurality of implants, the width of the lateral surface of the threading remains within the range defined in the second aspect of the present invention, it is preferable that the pitch of the threading of the threaded section varies depending on the maximum outer diameter and axial length of the implants. A smaller pitch is preferred on implants with a shorter axial length, as this increases the primary stability. On longer implants however a larger pitch is desirable as it enables the implant to be inserted faster into the bone. In addition, altering the pitch over different diameters of implant is a useful tool for controlling the width of the lateral surface while enabling the thread depth to be as large as possible. Increasing the depth of the threads while maintaining the same pitch could result in the lateral surface becoming too small, as the apical and coronal flanks of the thread taper towards one another in the radially outer direction. Increasing the thread pitch increases the thread width at the core and therefore also the width at the lateral surface. Thus, for larger diameter implants the pitch can be made larger in comparison to smaller diameter implants in order to maintain the lateral surface width limits of the present invention.

Preferably, for a given maximum outer diameter of threaded portion, the pitch of the threading in the threaded portion increases with the axial length of the threaded portion. Additionally or alternatively, for a given length of threaded portion, the pitch of the threading in the threaded portion preferably increases with the maximum outer diameter of the threaded portion. Preferably, the plurality of implants each have a pitch of threading in the threaded portion of between 0.75 and 1.45 mm, wherein at least one implant having a longer axial length than a second implant has a larger pitch than said second implant and at least one implant having a larger maximum outer diameter of threaded section than a third implant and a larger pitch than said third implant.

Preferred aspect of the present invention will now be described, by way of example only, in which.

Figures 1A, 1B, 2A, 2B:
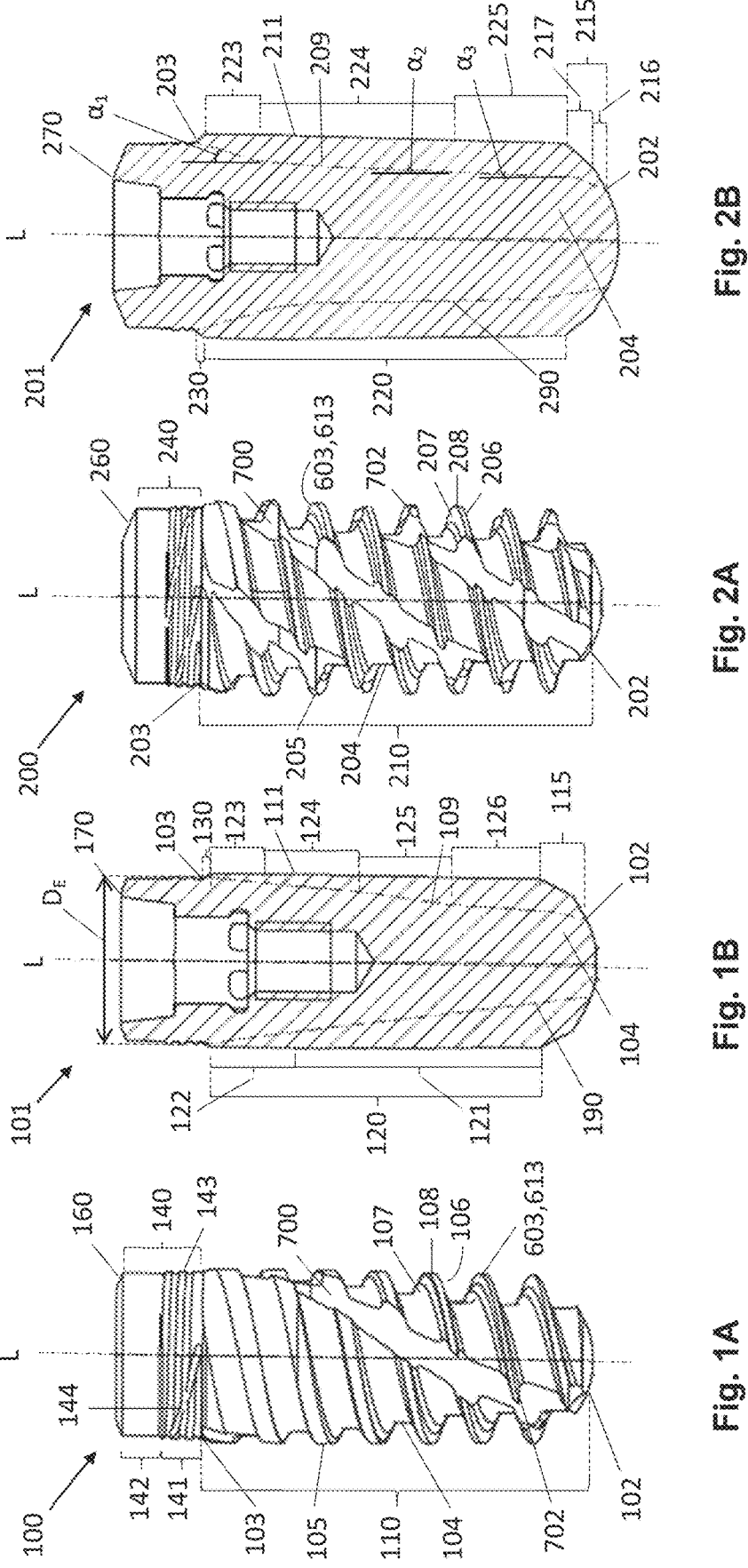
FIG. 1A shows a dental implant according to a preferred embodiment of the present invention.
FIG. 1B shows a cross-section through a blank of the dental implant shown in FIG. 1A.
FIG. 2A shows a dental implant according to a second preferred embodiment of the present invention.
FIG. 2B shows a cross-section through a blank of the dental implant shown in FIG. 2A.
Figures 3A, 3B, 4A, 4B:
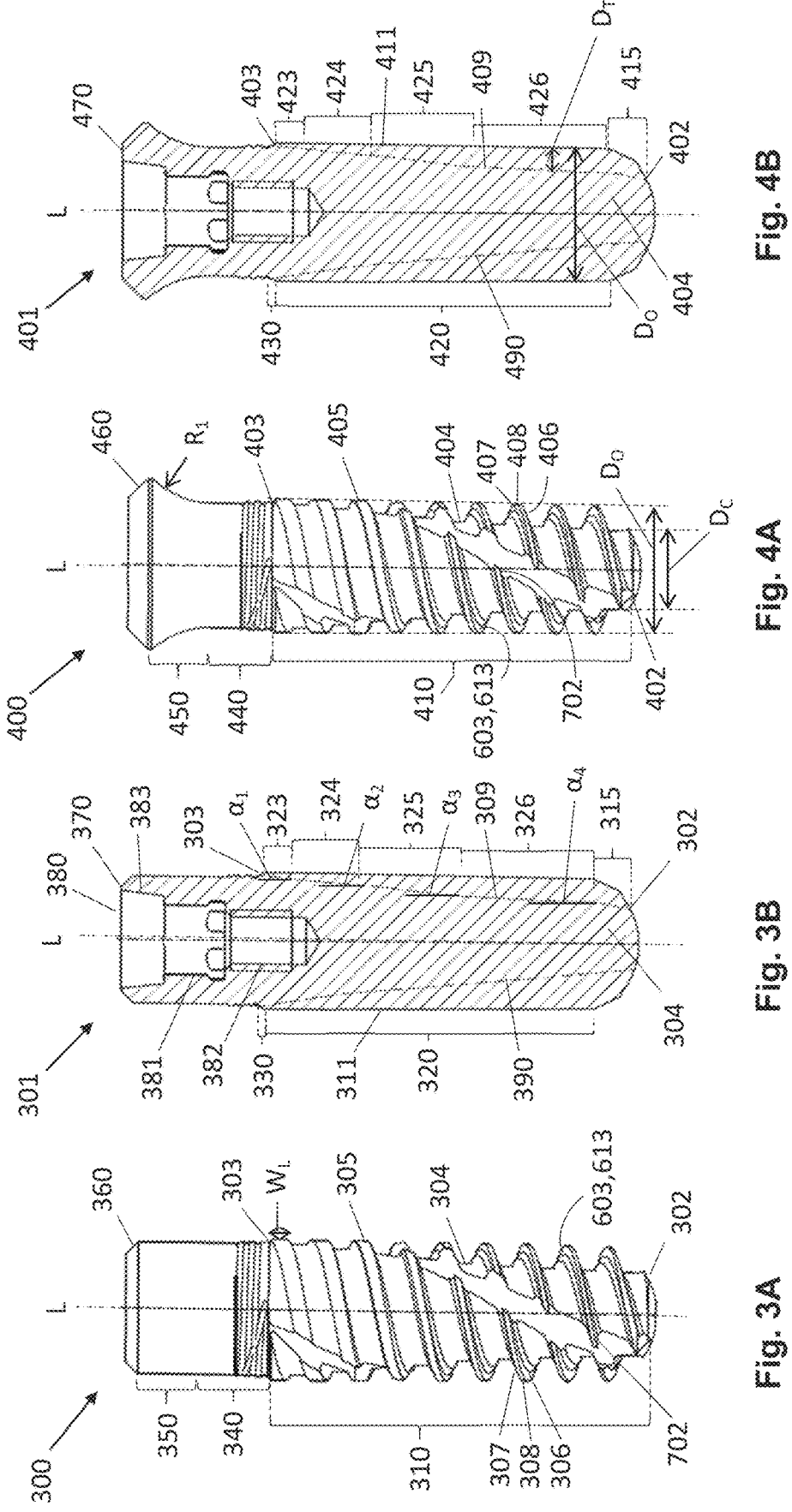
FIG. 3A shows a dental implant according to a third preferred embodiment of the present invention.
FIG. 3B shows a cross-section through a blank of the dental implant shown in FIG. 3A.
FIG. 4A shows a dental implant according to a fourth preferred embodiment of the present invention.
FIG. 4B shows a cross-section through a blank of the dental implant shown in FIG. 4A.
Figure 5B:
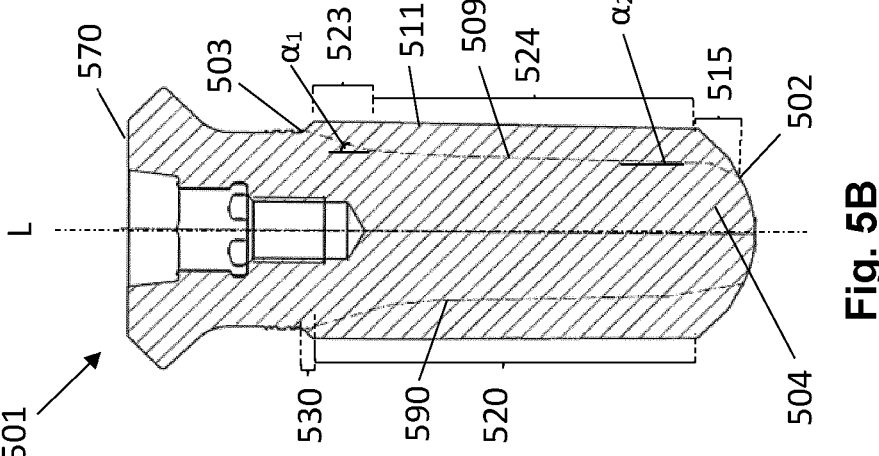
FIG. 5B shows a cross-section through a blank of the dental implant shown in FIG. 5A.
Figure 5A:
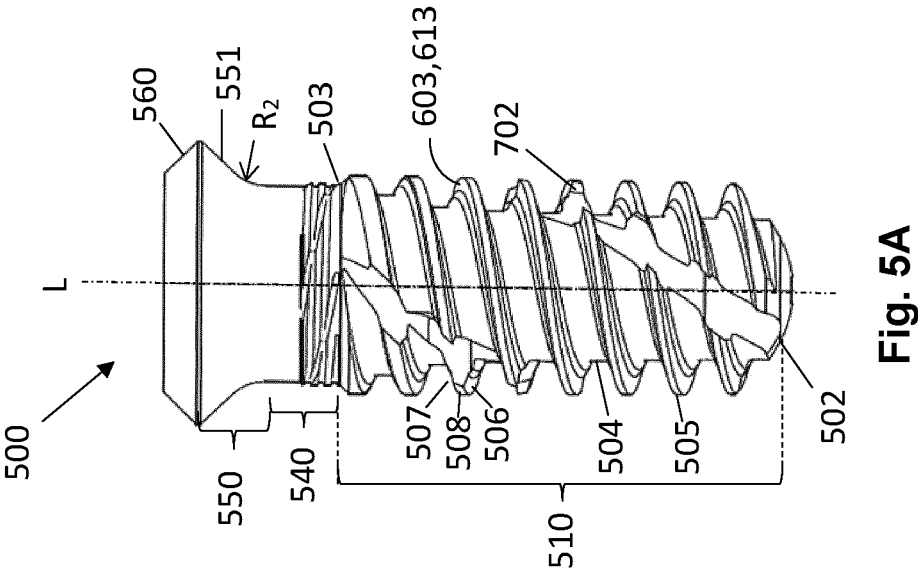
FIG. 5A shows a dental implant according to a fifth preferred embodiment of the present invention.
Figures 6A, 6B, 7:
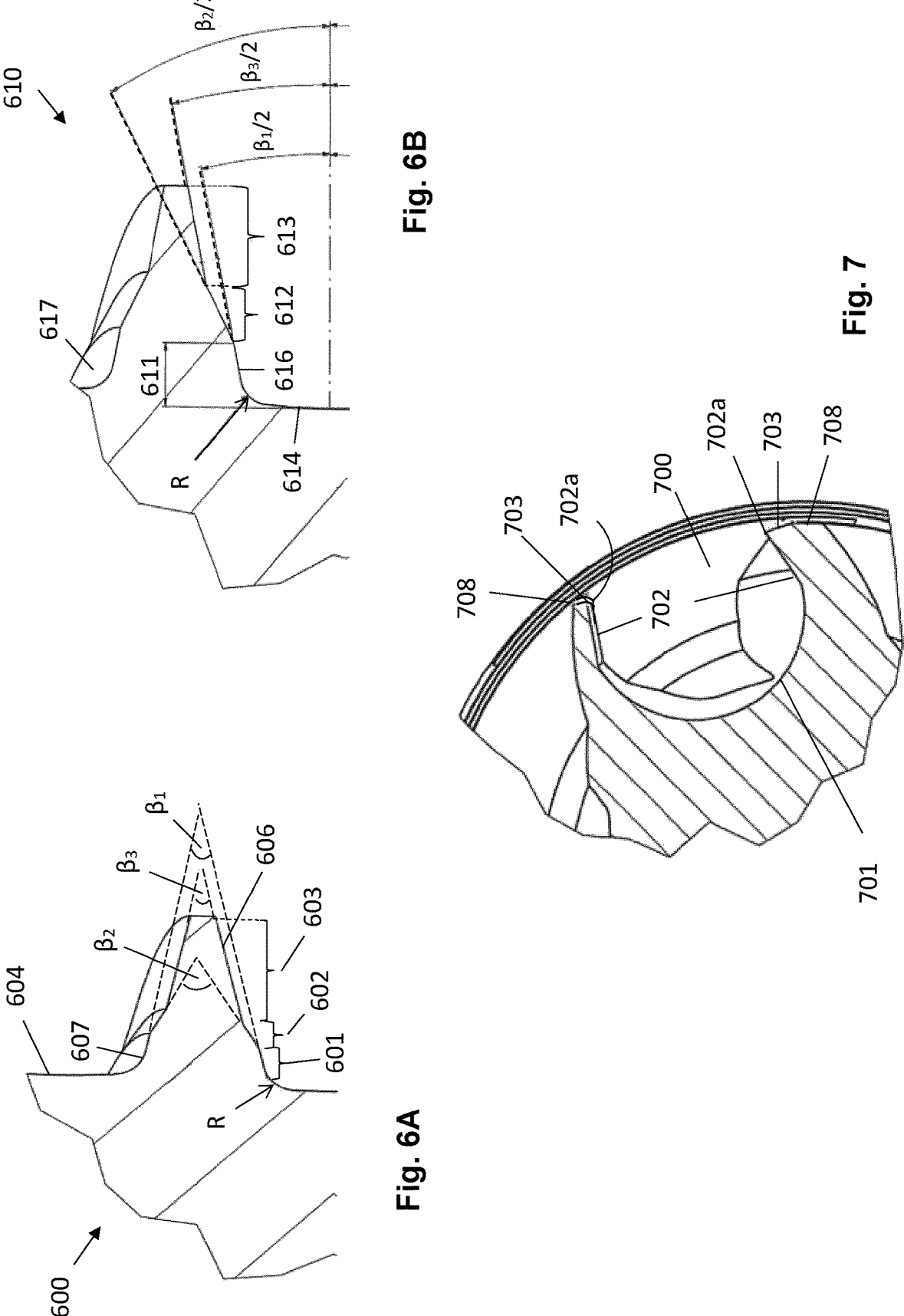

FIG. 6A-B shows thread profiles according to the first aspect of the present invention, which can be applied to each of the implants shown in FIGS. 1A-5A;

FIG. 7 shows a cross-section of the flute according to the third aspect of the present invention, which can be applied to each of the implants shown in FIGS. 1A-5A.

Throughout the following description, like features will be referenced with like reference numerals.

FIGS. 1A, 2A, 3A, 4A and 5A each show a dental implant 100, 200, 300, 400, 500 according to alternative preferred embodiments of the present invention. FIGS. 1B, 2B, 3B, 4B and 5B show cross-sections through the respective blanks 101, 201, 301, 401, 501 of implants 100, 200, 300, 400, 500. These blanks 101, 201, 301, 401, 501 show the shape of the implant prior to machining of the threading of each implant, and thus provide a clear indication of the outer diameter formed by the lateral surface of the threading.

Each of implants 100, 200, 300, 400, 500 comprises a threaded portion 110, 210, 310, 410, 510 which extends along a central longitudinal axis L from an apical end 102, 202, 302, 402, 502 to a coronal end 103, 203, 303, 403, 503. The threaded portions 110, 210, 310, 410, 510 each comprise a core 104, 204, 304, 404, 504, from which threading 105, 205, 305, 405, 505 extends radially outwards. The threading 105, 205, 305, 405, 505 comprises an apical flank 106, 206, 306, 406, 506, a coronal flank 107, 207, 307, 407, 507 and a lateral surface 108, 208, 308, 408, 508 connecting the apical and coronal flanks, the lateral surface 108, 208, 308, 408, 508 defining the radially outermost surface of the threading 105, 205, 305, 405, 505. The threading 105, 205, 305, 405, 505 extends along the full length of the threaded portion 110, 210, 310, 410, 510 in a helical manner and, as can be seen in each of FIGS. 1A-5A, the thread width narrows in the radially outwards direction such that threading is widest where it contacts the core and narrows towards the lateral surface 108, 208, 308, 408, 508. In each of the implants 100, 200, 300, 400, 500 the threading 105, 205, 305, 405, 505 is a double start thread.

The core diameter $D_C$ of the threaded portions 110, 210, 310, 410, 510 is defined by the outer diameter of the core 104, 204, 304, 404, 504 and the outer diameter $D_O$ of the threaded portions 110, 210, 310, 410, 510 is defined by the lateral surface 108, 208, 308, 408, 508 of the threading 105, 205, 305, 405, 505. The outer diameter $D_O$ of the threaded portion 110, 210, 310, 410, 510 can be visualised by drawing two axially extending lines on either side of the implant, each line contacting and extending along the lateral surface 108, 208, 308, 408, 508 of the threading 105, 205, 305, 405, 505, the diameter at any given axial location of the threaded portion being given by the distance between these lines.

Alternatively the outer diameter can be clearly seen in FIGS. 1B-5B. In the blanks 101, 201, 301, 401, 501 the threading 105, 205, 305, 405, 505 has not yet been machined and therefore the lateral surface 108, 208, 308, 408, 508 extends over the full length of the threaded portion 110, 210, 310, 410, 510. After milling of the threading 105, 205, 305, 405, 505 only sections of this lateral surface 108, 208, 308, 408, 508 will remain, but this surface still defines the outer diameter $D_O$.

For simplicity the core diameter $D_C$ and outer diameter $D_O$ have only been indicated in FIG. 4A, and in respect of the outer diameter $D_O$ also in FIG. 4B. However the core and outer diameters $D_C$, $D_O$ of implants 100, 200, 300, 500 are obtained in an identical manner.

It should be noted that the core diameter $D_C$ is not shown in the blanks 101, 201, 301, 401, 501, as the left hand half of these cross-sections shows the depth of the flute, and not the core, as will be discussed further below.

As will be appreciated, particularly by viewing the blanks 101, 201, 301, 401, 501, in each of the preferred embodiments shown the thread depth $D_T$ varies over the axial length of the threaded portion 110, 210, 310, 410, 510. At any given axial location within the threaded portion 110, 210, 310, 410, 510, the thread depth $D_T$ is given by the difference in radial length between the outer surface of core 104, 204, 304, 404, 504 and the lateral surface 108, 208, 308, 408, 508. Once again this dimension is indicated only in FIG. 4B for simplicity.

As the thread width of threading 105, 205, 305, 405, 505 narrows in the radially outwards direction, this change in the thread depth $D_T$ within the threaded portion 110, 210, 310, 410, 510 will affect the width of the lateral surface 108, 208, 308, 408, 508 along the length of the threaded portion 110, 210, 310, 410, 510, as is clearly seen in each of FIGS. 1A-5A.

The change in core diameter $D_C$ in each of implants 100, 200, 300, 400, 500 is shown in FIGS. 1B-5B respectively by lines 109, 209, 309, 409, 509, while the change in outer diameter $D_O$ is indicated by lines 111, 211, 311, 411, 511.

In each of the described preferred embodiments, the threaded portion 110, 210, 310, 410, 510 comprises an apical section 115, 215, 315, 415, 515 and a main body section 120, 220, 320, 420, 520.

Within the apical section 115, 215, 315, 415, 515 the taper angle of the outer diameter, relative to the central longitudinal axis L, is always greater than 20°, the taper angle of the core diameter relative to the central longitudinal axis being less than the taper angle of the outer diameter at all axial locations of the apical section, such that the thread depth $D_T$ in the apical section 115, 215, 315, 415, 515 decreases in an apical direction. In the preferred embodiments the apical section 115, 215, 315, 415, 515 have an axial length of less than 1.6 mm.

The apical sections 115, 215, 315, 415, 515 each comprise two adjoining segments 216, 217 each segment 216, 217 having an outer diameter that tapers at a constant angle relative to the longitudinal axis L of the threaded portion 110, 210, 310, 410, 510. The outer diameter of the apical most segment 216 having a greater taper angle, as measured from the central longitudinal axis L, than the outer diameter of the coronal most segment 217. For simplicity these segments 216, 217 of the apical section 115, 215, 315, 415, 515 are indicated only in FIG. 2B, however these segments are also present in each of implants 100, 300, 400, 500. Having a greater taper angle in the apical most segment 216 causes the thread depth to very quickly increase in the coronal direction before increasing at a gentler amount, thus creating a more rounded apical section 115, 215, 315, 415, 515.

In each of the described preferred embodiments, the taper angle of the outer diameter of the apical most segment 216 is approximately 60°, while the taper angle of outer diameter of the coronal most segment 217 is between 28° and 48°. As can be seen from a comparison of FIGS. 1B and 2B for example, the taper angle of the coronal most segment 217 varies depending on the outer diameter $D_O$ of the of the threaded portion 110, 210, 310, 410, 510 at the coronal end of the apical section 115, 215, 315, 415, 515. The larger the outer diameter $D_O$, the greater the taper angle within the coronal most segment 217.

In the main body section 120, 220, 320, 420, 520 the taper angle of the outer diameter relative to the central longitudinal axis is always less than 5°.

By limiting the taper angle in this way, the outer diameter $D_O$ of the main body section 120, 220, 320, 420, 520 increases only very gradually in the coronal direction, thus controlling the torque required during insertion of the implant 100, 200, 300, 400, 500 into hard bone. In addition, having a low taper angle in the main body section 120, 220, 320, 420, 520 increases primary stability as, for a given diameter of bore hole, a larger number of thread peaks can cut into the bore wall.

It is possible for the outer diameter $D_O$ to taper along the full axial length of the main body section 120, 220, 320, 420, 520, at either a constant taper angle or varying taper angles. However, in each of the preferred embodiments shown, the outer diameter of the main body section 120, 220, 320, 420, 520 comprises an apical segment 121 in which the outer diameter tapers radially inward in the apical direction with a taper angle of less than 2.5°, and a coronal segment 122, in which the outer diameter $D_O$ has a taper angle of 0°, thus defining a cylindrical surface in the coronal most part of the main body section 120, 220, 320, 420, 520. For simplicity these segments 121, 122 of the main body section 120, 220, 320, 420, 520 are indicated only in FIG. 1B, however these segments are also present in each of implants 200, 300, 400, 500.

In each of the shown embodiments, the axial length of coronal segment 122 is approximately 2 mm. The taper angle of the apical segment 121 is less than 1° in implants 100, 300, 400, 500 and less than 1.5° in implant 200.

While this taper angle is small, in order to control insertion torque and increase primary stability, the slight increase in outer diameter $D_O$ over the apical segment 121 helps to compress soft bone in the radial direction when the implant 100, 200, 300, 400, 500 is inserted into soft bone.

In each of the shown preferred embodiments, the core diameter $D_C$ of the threaded portion 110, 210, 310, 410, 510 tapers radially inwards in the apical direction over the full axial length of the threaded portion, as shown by lines 109, 209, 309, 409, 509. The fully tapered nature of the core diameter $D_C$ enables the implant 100, 200, 300, 400, 500 to compress soft bone along the full axial extent of the threaded portion 110, 210, 310, 410, 510 when placed in an under-prepared bore hole, that is, a bore hole having a diameter less than the core diameter $D_C$ of the threaded portion 110, 210, 310, 410, 510. As the implant is inserted into the bone, the gradually increasing diameter of the core 109, 209, 309, 409, 509 compresses the soft bone in the radial direction around the threaded portion 110, 210, 310, 410, 510 of the implant 100, 200, 300, 400, 500.

As discussed above, while compression of soft bone is desirable in order to increase primary stability, when the implant is inserted into hard bone compression of the bone is not desirable and/or not possible. Therefore, when inserting the implant 100, 200, 300, 400, 500 into hard bone, the surgeon creates a bore hole having a diameter greater than the maximum diameter of the core diameter $D_C$, such that the core will not compress the hard bone during insertion. As discussed above, the taper angle of the main body section 120, 220, 320, 420, 520 is less than 2.5° in each of the shown embodiments in order to control the insertion torque when inserting the implant 100, 200, 300, 400, 500 into hard bone. In addition, in each of the preferred embodiments the thread profile of the threading 105, 205, 305, 405, 505 is shaped to assist insertion of the implant into hard bone, as will be discussed further below, in relation to FIGS. 6A and 6B.

While the core diameter $D_C$ of the threaded portion 110, 210, 310, 410, 510 of each implant 100, 200, 300, 400, 500 tapers continuously over the full axial extent of the threaded portion 110, 210, 310, 410, 510, the taper angle is not constant.

In particular, within the main body section 120, 220, 320, 420, 520 the core 104, 204, 304, 404, 504 comprises at least two adjacent segments, 223, 224, 225 the core diameter $D_C$ of each segment tapering at a different angle, $\alpha_1$, $\alpha_2$, $\alpha_3$, relative to the central longitudinal axis L of the threaded portion. In some embodiments, such as implant 200, the main body section 220 comprises exactly three core segments 223, 224, 225. In such embodiments the taper angles $\alpha_1$, $\alpha_2$, $\alpha_3$ preferably increase sequentially in the coronal direction. In other embodiments, such as implant 300, the main body section 320 comprises exactly four core segments 323, 324, 325, 326. In such embodiments, the taper angles $\alpha_1$, $\alpha_2$, $\alpha_3$, $\alpha_4$, preferably do not increase sequentially.

Instead one segment 325 is bordered in both the apical and coronal directions by a core segment 326, 324 having a smaller taper angle. In such embodiments therefore the rate of increase of the core diameter $D_C$ increases and then decreases in the coronal direction. In other embodiments, such as implant 500, the main body section 520 comprises exactly two core segments 523, 524.

For simplicity the core segments of implants 100 and 400 are not shown, however, the main body section 120, 420 each comprise four core segments 123, 124, 125, 126, 423, 424, 425, 426 having different taper angles $\alpha$ relative to the central longitudinal axis L The core segments 123-126, 223-225, 323-326, 423-426, 523, 524 are used in conjunction with the outer diameter $D_O$ of the threaded portion 120, 220, 320, 420, 520 in order to control the width of the lateral surface 108, 208, 308, 408, 508 of the threading 105, 205, 305, 405, 505 within the main body section 120, 220, 320, 420, 520. In each of the shown embodiments, the width of the lateral surface $W_L$, shown for simplicity only in FIG. 3A, of the threading 105, 205, 305, 405, 505 within the main body section 120, 220, 320, 420, 520 is never less than 0.08 mm and never greater than 0.45 mm.

These upper and lower limits on the width of the lateral surface $W_L$ prevent this surface from becoming too narrow (which could result in fracture or distortion of the apical parts of the thread) or too broad (which could lose the cutting function of the thread and increase the insertion torque within hard bone to unacceptable levels). These upper and lower limits on the width of the lateral surface $W_L$ therefore improve the ability of the implants 100, 200, 300, 400, 500 to self tap into hard bone while maintaining insertion torque within acceptable levels.

As mentioned above, the width of the threading 105, 205, 305, 405, 505 of each implant 100, 200, 300, 400, 500 tapers in the radially outwards direction, such that the threading 105, 205, 305, 405, 505 is widest where it contacts the core 104, 204, 304, 404, 504 and narrows towards the lateral surface 108, 208, 308, 408, 508.

In each of the shown preferred embodiments, the base thread profile of the threading and the thread width at the core remain constant along the axial extent of the threaded portion 110, 210, 310, 410, 510. This means that the the shape of the apical 106, 206, 306, 406, 506 and coronal 107, 207, 307, 407, 507 flanks remain constant along the axial extent of the threaded portion 120, 220, 320, 420, 520, such that changes in the width $W_L$ of the lateral surface 108, 208, 308, 408, 508 are the results of changes in the thread depth $D_T$ along the threaded portion 110, 210, 310, 410, 510.

FIGS. 6A and 6B show the examples of thread profiles according to the first aspect of the present invention, both of which can be used as the base thread profile for the threading 105, 205, 305, 405, 505 of implants 100, 200, 300, 400, 500.

FIGS. 6A and 6B each show a thread profile 600, 610 formed of exactly three sub-segments 601-603, 611-613 arranged sequentially in the radial direction, wherein in each sub-segment the apical 606, 616 and coronal 607, 617 flank taper towards one another at a constant angle $\beta$, the middle sub-segment 602, 612 having a taper angle $\beta_2$ that is greater than the taper angles $\beta_1$, $\beta_3$ of the radially innermost 601, 611 and radially outermost 603, 613 sub-segments, the taper angle formed between the apical 606, 616 and coronal 607, 617 flanks in the radially outermost sub-segment 603, 613 being less than 30°.

The angles $\beta_1$, $\beta_2$, $\beta_3$ are shown in FIG. 6B as half angles.

In these preferred embodiments, the taper angles $\beta_1$, $\beta_3$ of the radially innermost 601, 611 and radially outermost 603, 613 sub-segments are substantially the same and approximately 25°. The taper angle $\beta_2$ of the middle sub-segment 602, 612 is over twice that of the radially outmost 603, 613 sub-segment at approximately 60°.

The thread profiles of FIGS. 6A and 6B are formed exclusively by the three sub-segments 601-603, 611-613 described, to the extent possible by manufacturing techniques. Therefore in both profiles a small curved transition R is necessitated between the core 604, 614 and the radially innermost sub-segment 601, 611. Therefore, the radially innermost sub-segment 601, 611 effectively begins at the core diameter and the radially outermost sub-segment 603, 613 ends at the lateral surface of the threading, with no intervening additional sub-segments positioned between the three sub-segments.

The thread profile of FIGS. 6A and 6B has benefits during insertion into both hard and soft bone. The narrow angle $\beta_3$ of the radially outermost sub-segment 603, 613 provides a good cutting ability, which is particularly important when the implant is inserted into hard bone. The provision of the middle sub-segment 602, 612 widens the thread at location radially inwards of the sharp cutting angle of the radially outmost sub-segment 603, 613, thus strengthening the thread as well as providing a greater axial compression of soft bone when the implant is inserted into an underprepared bore hole. The radially innermost sub-segment 601, 611 of the thread profile has a taper angle $\beta_1$ less than that of the middle sub-segment 602, 612, resulting in a better cutting function.

The thread profile shown in FIGS. 6A and 6B differ from one another in the relative radial lengths of the sub-segments 601-603, 611-613 and in the width of the thread at the core 604, 614. It can be seen for example that the middle sub-segment 612 has a greater radial length than middle sub-segment 602, resulting in a greater increase in thread width. The thread width, relative radial lengths and taper angles of the sub-segments can be adjusted depending on the implant with which the thread profile is intended to be used.

The base thread profile of the threading 105, 205, 305, 405, 505 of implants 100, 200, 300, 400, 500 can be formed by the three sub-segments 601-603, 611-613 described in relation to FIG. 6A or 6B.

Because the thread depth $D_T$ of the threading 105, 205, 305, 405, 505 varies along the axial extent of the threaded portion 110, 210, 310, 410, 510, the radially outermost sub-segment 603, 613, and even the middle sub-segment

602, 612, may not be present along the full axial length of the main body section 120, 220, 320, 420, 520.

However, as can be seen in FIGS. 1A-5A, the radially outermost sub-segment 603, 613 is present at least at the apical most part of the main body section 120, 220, 320, 420, 520 and is present along varying axial extents of the main body section 120, 220, 320, 420, 520. This is beneficial as it enables the radially outermost sub-segment 603, 613, with its enhanced cutting function, to be present in an apically located part of the threaded portion 110, 210, 310, 410, 510.

As the implants 100, 200, 300, 400, 500 of the shown preferred embodiments are driven into dense bone, the threading 105, 205, 305, 405, 505 initially cuts a groove into the bone corresponding to the thread shape at the apical end of the threaded portion 110, 210, 310, 410, 510. As described above, the thread depth $D_T$ in the apical section 115, 215, 315, 415, 515 of the threaded portion 120, 220, 320, 420, 520 increases rapidly in order to enable the threading 105, 205, 305, 405, 505 to cut into the bone. As the radially outermost sub-segment 603, 613 is located in the apical part of the main body section 120, 220, 320, 420, 520, this provides an enhanced cutting action, which is particularly beneficial in hard bone. As described above, the middle sub-segment 602, 612 strengthens the threading 105, 205, 305, 405, 505 and increases the compression provided to soft bone in under-prepared bore holes. As the implant 100, 200, 300, 400, 500 is driven further into the bone, the initial groove formed by the threading 105, 205, 305, 405, 505 is gradually widened in both the axial direction, as the lateral surface 108, 208, 308, 408, 508 widens, and radial direction, as the outer diameter $D_O$ increases. In this way, the groove within the bone is formed incrementally, ensuring that the insertion torque is not too great while at the same time providing a firm fixation within the bone. Furthermore, as the lateral surface width $W_L$ of the threading 105, 205, 305, 405, 505 within the main body section 120, 220, 320, 420, 520 is maintained with the range of 0.08-0.45 mm, this prevents the lateral surface 108, 208, 308, 408, 508 from becoming too narrow (which could result in fracture or distortion of the apical parts of the thread) or too broad (which could lose the cutting function of the thread and increase the insertion torque within hard bone to unacceptable levels).

The implants 100, 200, 300, 400, 500 of the shown preferred embodiments further comprise at least 2 flutes 700. Implant 200 comprises four flutes 700. The flutes 700 extend in a helical manner along the full length of the threaded portion 110, 210, 310, 410, 510. In this way cutting edges are provided along the full length of the threaded portion 110, 210, 310, 410, 510. The helical nature of the flutes 700 enables bone chips to be transported and distributed along the length of the threaded portion 110, 210, 310, 410, 510.

The flutes 700 extend into the core 104, 204, 304, 404, 504 of the threaded portion 110, 210, 310, 410, 510. This is shown by line 190, 290, 390, 490, 590 respectively in FIGS. 1B-5B. This line 190, 290, 390, 490, 590 shows the depth of the flute 700 along the axial extent of the threaded portion 120, 220, 320, 420, 520. By comparing this line 190, 290, 390, 490, 590 to the line 109, 209, 309, 409, 509 indicting the core diameter $D_C$, it can be seen that the flute 700 always extends into the core 104, 204, 304, 404, 504. In this way each flute forms a continuous channel over the length of the threaded section 120, 220, 320, 420, 520 for bone chip transport.

In each of the implants 100, 200, 300, 400, 500, the cross-section of the flute 700, at least in a portion of the threading 105, 205, 305, 405, 505, is shown in FIG. 7.

As shown in this figure, the cross-section of the flute 700 within at least a portion of the threading 705 comprises a circular arc 701 and, adjacent each end of the circular arc 701, opposing straight sections 702 which taper towards one another in the radially outwards direction, and, adjacent each straight section 702, transition surfaces 703 which connect the radially outer ends of the straight sections 702 to the lateral surface 708 of the threading 705, the lateral surface 708 of the threading having a greater radius than the outer end 702a of the straight sections 702 such that the leading cutting edge of the flute is located radially inward of the lateral surface 708.

As discussed in more detail above, the straight sections 702 form undercuts in the thread, which creates a more aggressive cutting edge. The fact that the flute 700 comprises straight sections on both sides means that the flute 700 provides the same cutting ability regardless of the direction of rotation of the implant. This is beneficial for exact placement of the implant.

The transition surfaces 703, when brought into contact with soft bone, guide and compress the bone radially outwards. Therefore, rather than this bone being cut away by the sharp cutting edge of the flute 700, it instead forms part of the bone mass which is compressed around the implant, improving primary stability. When inserted into hard bone however, this bone will not compress and hence is contacted and cut by the leading edge 702a within the flute 700.

In each of the shown embodiments, the thread depth $D_T$ generally decreases in the coronal direction along the main body section 120, 220, 320, 420, 520 of the threaded portion 110, 210, 310, 410, 510. Therefore, depending on the length of the straight sections 702, the undercut may not be present along the full length of the threading 105, 205, 305, 405, 505.

However, the above described straight sections 702 of the flute 700 are present in the apical part of the main body section 120, 220, 320, 420, 520. It is the apical part of the threaded section 110, 210, 310, 410, 510 which will need to have the greatest cutting ability and therefore it is this area of the implant which benefits most from the inclusion of the flute undercut.

The straight sections 702 and transition surface 703 of the flute 700 enhances the ability of the threading 105, 205, 305, 405, 505 to cut into hard bone while assisting in the compression of soft bone.

The threaded portion 120, 220, 320, 420, 520 of each implant further comprises, at its coronal end 103, 203, 303, 403, 503, a thread run out section 130, 230, 330, 430, 530, in which the outer diameter $D_O$ tapers radially inwards in the coronal direction such that, at the coronal end of the run out section, the outer diameter $D_O$ is equal to the core diameter $D_C$. This run out section 130, 230, 330, 430, 530 is as short as possible and in each embodiment has an axial length of less than 1 mm.

The threaded portions 120, 220, 320, 420, 520 described above can be used in one-part and two part implants.

In each of the embodiments of FIG. 1A-5A the implant 100, 200, 300, 400, 500 is the anchoring part of a two part implant, wherein the implant as a whole extends along the central longitudinal axis L of the threaded portion 120, 220, 320, 420, 520.

Implants 100 and 200 are bone level implants, whereas implants 300, 400 and 500 are tissue level implants.

Each implant 100, 200, 300, 400, 500 comprises a neck portion 140, 240, 340, 440, 540 coronal of the threaded portion 120, 220, 320, 420, 520. For simplicity the neck portion 140, 240, 340, 440, 540 will only be described in detail in relation to FIG. 1A, however all elements of the neck portion 140 described below are also present in neck portions 240, 340, 440, 540.

The neck portion 140 is circular cylindrical with an external diameter $D_E$ (see FIG. 1B) which is less than the maximum outer diameter $D_O$ of the threaded portion 120, 220, 320, 420, 520. the neck portion 140, 240, 340, 440, 540 comprises two axially arranged, adjacent sections 141, 142. The apical neck section 141, which lies directly adjacent to the coronal end of the threaded portion 120 comprises a helical micro-thread 143 include a flute 144.

The coronal neck section 142, in contrast to the apical neck section 141, does not comprise any grooves or threading. This section is therefore smoother than the apical neck section 141.

In addition to the neck portion 340, 440, 540, implants 300, 400, 500 further comprise a head portion 350, 450, 550 arranged to extend, in use, into the soft tissue of a patient.

In each case the diameter of the apical end of the head portion 350, 450, 550 is equal to the diameter of the coronal end of the neck portion 340, 440, 540 such that the neck portion smoothly transitions into the head portion.

In FIGS. 3A and 3B the head portion 350 is circular cylindrical, while in FIGS. 4A, 4B, 5A, 5B the head portion 450, 550 comprises a flared out section which extends radially outward in the coronal direction, wherein the diameter of the coronal end of the flared out section is greater than the maximum outer diameter $D_O$ of the threaded section 120, 220, 320, 420, 520.

In the embodiment of FIGS. 4A-B the flared out section tapers radially outwards in the coronal direction over a radius $R_I$, thus creating a curved longitudinal cross-section.

In the embodiment of FIG. 5A-b the flared out section comprises both a curved and a straight, tapered cross-section, the apical end of the flared out section tapering radially outwards over a radius $R_2$ before continuing to flare outwards in a conical manner; namely, with a straight, tapered cross-section 551.

In each of the described embodiments the implant 100, 200, 300, 400, 500 comprises at its coronal end a beveled part 160, 260, 360, 460, 560 which tapers radially inwards in the coronal direction to form a truncated cone and a flat shoulder 170, 270, 370, 470, 570 which defines the coronal end of the dental implant 100, 200, 300, 400, 500.

As implants 100, 200, 300, 400, 500 are two-part implants these comprise standard abutment connection geometry which will be described briefly in relation to FIG. 3B, this description being valid for all of implants 100, 200, 300, 400, 500. The implant 300 comprises a blind bore 380 extending from the coronal end 370 of the implant along the central longitudinal axis L of the threaded portion, the blind bore 380 comprising an anti-rotation means 381 having a non-circular-symmetric cross-section in a plane perpendicular to the central longitudinal axis L and, apical of said anti-rotation means, a threaded section 382. The blind bore 380 further comprises, coronal of the anti-rotation means 381, a conical portion 383 tapering radially outwards in the coronal direction. Such a tapered portion 383 can form a secure seal with a complementary shaped abutment, thus preventing bacteria from entering the implant 100, 200, 300, 400, 500.

The above described embodiments are for illustrative purposes only and the skilled person will realize that alternative arrangements are possible which fall within the scope of the claims. For example, the threaded portion can be used with one-part implants or two part implants comprising alternative implant connection geometries, neck portions and head portions.

The invention claimed is:

1. A dental implant comprising
a threaded portion extending along a central longitudinal axis from an apical end to a coronal end,
the threaded portion comprising a core from which threading extends radially outwards,
the threading comprising an apical flank, a coronal flank and a lateral surface connecting the apical and coronal flanks, the lateral surface defining the radially outermost surface of the threading, the threading extending along a length of the threaded portion in a helical manner and a thread width narrowing in the radially outwards direction such that the threading is widest where it contacts the core and narrows towards the lateral surface,
a core diameter of the threaded portion being defined by an outer diameter of the core and an outer diameter of the threaded portion being defined by the lateral surface of the threading,
wherein:
over at least a section of an axial extent of the threaded portion, a thread profile of the apical and coronal flanks of the threading is formed of exactly three sub-segments arranged sequentially in the radial direction, the sub-segments comprising a middle sub-segment, a radially innermost sub-segment, and a radially outermost sub-segment,
in each sub-segment, the apical and coronal flanks taper towards one another at a constant angle, the middle sub-segment having a taper angle that is greater than the taper angles of the radially innermost and radially outermost sub-segments, the taper angle formed between the apical and coronal flanks in the radially outermost sub-segment being less than 30°, and
the thread width at the core is constant along a full axial extent of the threaded portion, the thread width being a linear distance measured between the coronal flank and the apical flank, the thread depth along said threaded portion changes, resulting in changes in a width of the lateral surface, and the thread depth is a dimension of the threading extending from the core to the lateral surface and is transverse to the width of the lateral surface.

2. The dental implant as claimed in claim 1, wherein the core diameter of the threaded portion tapers radially inwards in the apical direction over the full axial extent of the threaded portion.

3. The dental implant as claimed in claim 1, wherein the outer diameter of the threaded portion tapers radially inwards in the apical direction within at least an apical half of the threaded portion along the central longitudinal axis.

4. The dental implant as claimed in claim 3, wherein:
the threaded portion comprises an apical section and a main body section,
within the apical section, the taper angle of the outer diameter of the threaded portion, relative to the central longitudinal axis, is always greater than 20°, the taper angle of the core diameter relative to the central longitudinal axis being less than the taper angle of the outer diameter at all axial locations of the apical section, such that a thread depth in the apical section continuously decreases in an apical direction, the apical section having an axial length of less than 2 mm, and within the main body section, the taper angle of the outer diameter of the threaded portion, relative to the central longitudinal axis, is always less than 5°.

5. The dental implant as claimed in claim 4, wherein within the main body section, the width of the lateral surface of the threading is never less than 0.08 mm and never greater than 0.45 mm.

6. The dental implant as claimed in claim 4, wherein the thread profile of the threading is formed by said three sub-segments over at least one quarter of the axial extent of the main body section.

7. The dental implant as claimed in claim 4, wherein the thread profile of the threading is formed by said three sub-segments at an axial location within an apical most half of the main body section along the central longitudinal axis.

8. The dental implant as claimed in claim 4, wherein the taper angle of the outer diameter of the threaded portion in the main body section is always less than 2.5°.

9. The dental implant as claimed in claim 4, wherein the outer diameter of the threaded portion tapers radially inwards over at least the apical half of the main body section along the central longitudinal axis.

10. The dental implant as claimed in claim 5, wherein the main body section comprises an apical segment, in which the outer diameter of the threaded portion tapers radially inward in the apical direction, and a coronal segment, in which the outer diameter of the threaded portion has a taper angle of 0° and thus defines a cylindrical surface.

11. The dental implant as claimed in claim 5, wherein within the main body section, the core comprises at least two adjacent segments, the core diameter of each segment tapering at a different angle relative to the central longitudinal axis of the threaded portion.

12. The dental implant as claimed in claim 4, wherein in the main body section at every axial location, the taper angle of the core diameter is greater than the taper angle of the outer diameter of the threaded portion, such that the thread depth in the main body section continuously increases in the apical direction and a width of the lateral surface continuously increases in the coronal direction.

13. The dental implant as claimed in claim 1, wherein the angle between the apical and coronal flanks in the radially outermost sub-segment is between 20° and 29°.

14. The dental implant as claimed in claim 1, wherein the taper angle of the middle sub-segment is at least twice the taper angle of the radially outermost sub-segment.

15. The dental implant as claimed in claim 1, wherein the taper angles of the radially inner and outermost sub-segments are substantially the same.

16. The dental implant as claimed in claim 1, wherein the thread profile of the threading is formed by said three sub-segments over at least one quarter of the axial extent of the threaded portion.

17. The dental implant as claimed in claim 1, wherein the thread profile of the threading is formed by said three sub-segments at an axial location within an apical most half of the threaded portion along the central longitudinal axis.

18. The dental implant as claimed in claim 1, wherein the threading comprises a double start thread.

19. The dental implant as claimed in claim 1, wherein the threaded portion comprises, at its coronal end, a thread run out section in which the outer diameter of the threaded portion tapers radially inwards in the coronal direction such that, at the coronal end of the run out section, the outer diameter of the threaded portion is equal to the core diameter.

20. The dental implant as claimed in claim 1, wherein the threaded portion comprises at least two flutes which extend in a helical manner along the full axial extent of the threaded portion.

21. The dental implant as claimed in claim 20, wherein the cross-section of the flutes within the threading, in a plane perpendicular to the central longitudinal axis, comprises a circular arc and two opposing straight sections located adjacent to the radially outer ends of the circular arc, said straight sections tapering towards one another in the radially outwards direction.

22. The dental implant as claimed in claim 21, wherein the threaded portion comprises an apical section and a main body section, and said straight sections are present in the threading over 15-100% of an axial length of the main body section along the central longitudinal axis.

23. The dental implant as claimed in claim 21, wherein the cross-section of the flutes further comprises adjacent each straight section, transition surfaces which connect the radially outer ends of the straight sections to the lateral surface of the threading, the lateral surface of the threading having a greater radius than the outer end of the straight sections such that the leading cutting edge of the flute is located radially inward of the lateral surface.

24. The dental implant as claimed in claim 1, further comprising a neck portion coronal of the threaded portion, the neck portion being circular cylindrical with an external diameter which is less than the maximum outer diameter of the threaded portion.

25. The dental implant as claimed in claim 1, further comprising, coronal of the threaded portion, a head portion arranged to extend, in use, into the soft tissue of a patient.

26. The dental implant as claimed in claim 25, wherein the head portion comprises a flared out section which extends radially outward in the coronal direction, wherein the diameter of the coronal end of the flared out section is greater than the maximum outer diameter of the threaded portion.

27. A plurality of the dental implants as claimed in claim 1, at least two of the plurality of implants having different maximum outer diameters of the threaded portion, within the range from 3 mm-8 mm, and at least two of the plurality of implants having different axial lengths, within the range from 5 mm to 25 mm.

28. The plurality of implants as claimed in claim 27, wherein a pitch of the threading of the threaded portion of each implant varies depending on the maximum outer diameter and axial length of the implant, wherein for a given maximum outer diameter of threaded portion, the pitch of the threading in the threaded portion increases with the axial length of the threaded portion and for a given length of threaded portion, the pitch of the threading in the threaded portion increases with the maximum outer diameter of the threaded portion.

* * * * *